(12) United States Patent
Kosaka et al.

(10) Patent No.: US 9,103,566 B2
(45) Date of Patent: Aug. 11, 2015

(54) SOLAR LIGHT COLLECTING DEVICE AND SOLAR HEAT COLLECTING FACILITY

(75) Inventors: Hiroshi Kosaka, Osaka (JP); Hirokazu Imoto, Osaka (JP); Keisuke Takemoto, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 497 days.

(21) Appl. No.: 13/521,852

(22) PCT Filed: Dec. 22, 2010

(86) PCT No.: PCT/JP2010/073081
§ 371 (c)(1),
(2), (4) Date: Jul. 12, 2012

(87) PCT Pub. No.: WO2011/086825
PCT Pub. Date: Jul. 21, 2011

(65) Prior Publication Data
US 2012/0285440 A1      Nov. 15, 2012

(30) Foreign Application Priority Data

Jan. 18, 2010    (JP) .................................. 2010-007645

(51) Int. Cl.
*F24J 2/38*    (2014.01)
*F24J 2/10*    (2006.01)
(Continued)

(52) U.S. Cl.
CPC ................ *F24J 2/1047* (2013.01); *F24J 2/145* (2013.01); *F24J 2/541* (2013.01);
(Continued)

(58) Field of Classification Search
CPC ................... F24J 2/12; F24J 2/13; F24J 2/14; F24J 2/1052; F24J 2/10

USPC .................................................. 359/847, 849
See application file for complete search history.

(56) References Cited

U.S. PATENT DOCUMENTS 2,825,326 A *   3/1958   Flynn, Jr. ........................ 126/553
3,973,834 A *   8/1976   Penn et al. ...................... 359/847
(Continued)

FOREIGN PATENT DOCUMENTS

| CN | 101457991 A | 6/2009 | ................. F24J 2/38 |
| JP | 56-54401 | 5/1981 | ............... G02B 5/08 |

(Continued)

OTHER PUBLICATIONS

Office Action issued in corresponding Japanese Patent Application No. 2011-549895, Apr. 15, 2014.
(Continued)

*Primary Examiner* — Kenneth Rinehart
*Assistant Examiner* — Jason Lau
(74) *Attorney, Agent, or Firm* — Kusner & Jaffe

(57) ABSTRACT

A solar light collecting device includes: a rectangular-shaped frame-like body 22 supported by a strut body 21 so as to be tiltable in a vertical plane; a flexible reflecting mirror 24 having two side edges 22*a* held by the frame-like body 22 and a quasi-parabolic cross section along the short sides thereof to reflect solar light; and a tilting cylinder device 25 which tilts the frame-like body 22 according to the altitude of the sun and guides the light reflected by the reflecting mirror 24 to a heat collecting device disposed at the focal point of the reflecting surface of the reflecting mirror. A curve adjusting device 27 contacts the rear surface of the reflecting mirror 24 according to the tilting position of the reflecting mirror 24 to change the degree of curve of the reflecting surface.

1 Claim, 22 Drawing Sheets

(51) Int. Cl.
*F24J 2/14* (2006.01)
*F24J 2/54* (2006.01)

(52) U.S. Cl.
CPC .... *F24J 2002/108* (2013.01); *F24J 2002/1014* (2013.01); *F24J 2002/5441* (2013.01); *F24J 2002/5448* (2013.01); *Y02E 10/45* (2013.01); *Y02E 10/47* (2013.01)

(56) References Cited

U.S. PATENT DOCUMENTS

| | | | | |
|---|---|---|---|---|
| 4,243,301 A | * | 1/1981 | Powell | 359/847 |
| 4,318,394 A | * | 3/1982 | Alexander | 126/575 |
| 4,483,323 A | * | 11/1984 | Murphy | 126/684 |
| 4,487,196 A | * | 12/1984 | Murphy | 126/690 |
| 4,511,215 A | * | 4/1985 | Butler | 359/847 |
| 4,552,438 A | * | 11/1985 | Murphy | 359/847 |
| 4,719,903 A | * | 1/1988 | Powell | 126/688 |
| 5,035,497 A | * | 7/1991 | Itoh | 359/849 |
| 5,997,146 A | * | 12/1999 | Denham et al. | 359/846 |
| 6,984,050 B2 | | 1/2006 | Nakamura | 359/853 |
| 6,994,082 B2 | * | 2/2006 | Hochberg et al. | 126/696 |
| 2009/0272375 A1 | * | 11/2009 | Pedretti | 126/696 |

FOREIGN PATENT DOCUMENTS

| | | | | |
|---|---|---|---|---|
| JP | 2003-124741 | 4/2003 | ........... | H01Q 19/185 |
| JP | 2004-037037 | 5/2004 | ................ | F24J 2/38 |
| JP | 2008-503709 | 2/2008 | ................ | F24J 2/38 |
| WO | WO 2006/000834 | 1/2006 | ................ | F24J 2/10 |

OTHER PUBLICATIONS

Office Action (dated Jul. 29, 2013) issued in connection with corresponding Chinese Patent Application No. 2010-80053963.8, including English translation.
International Search Report for International Application No. PCT/JP2010/073081, Mar. 8, 2011.

* cited by examiner

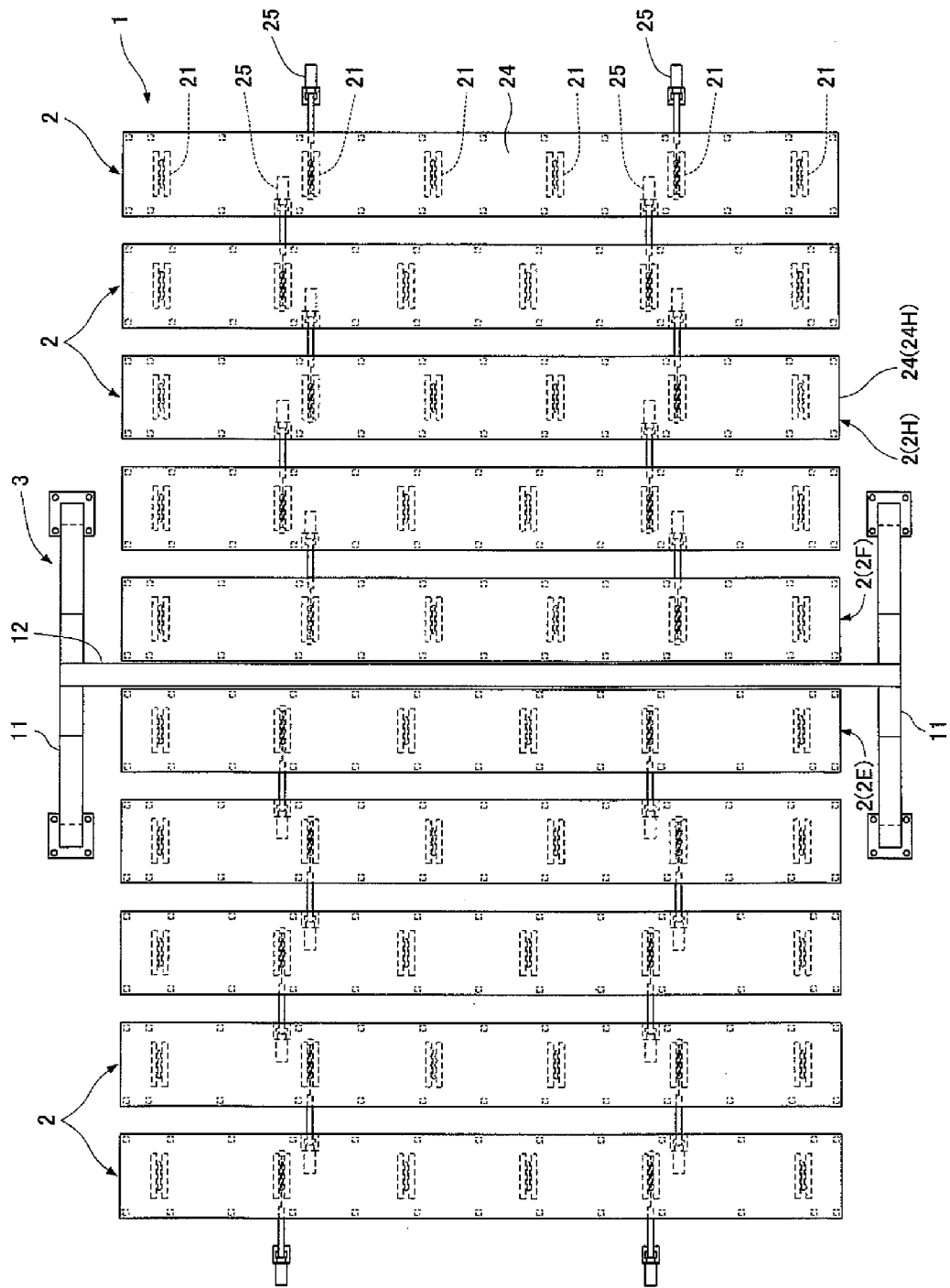

F I G. 4
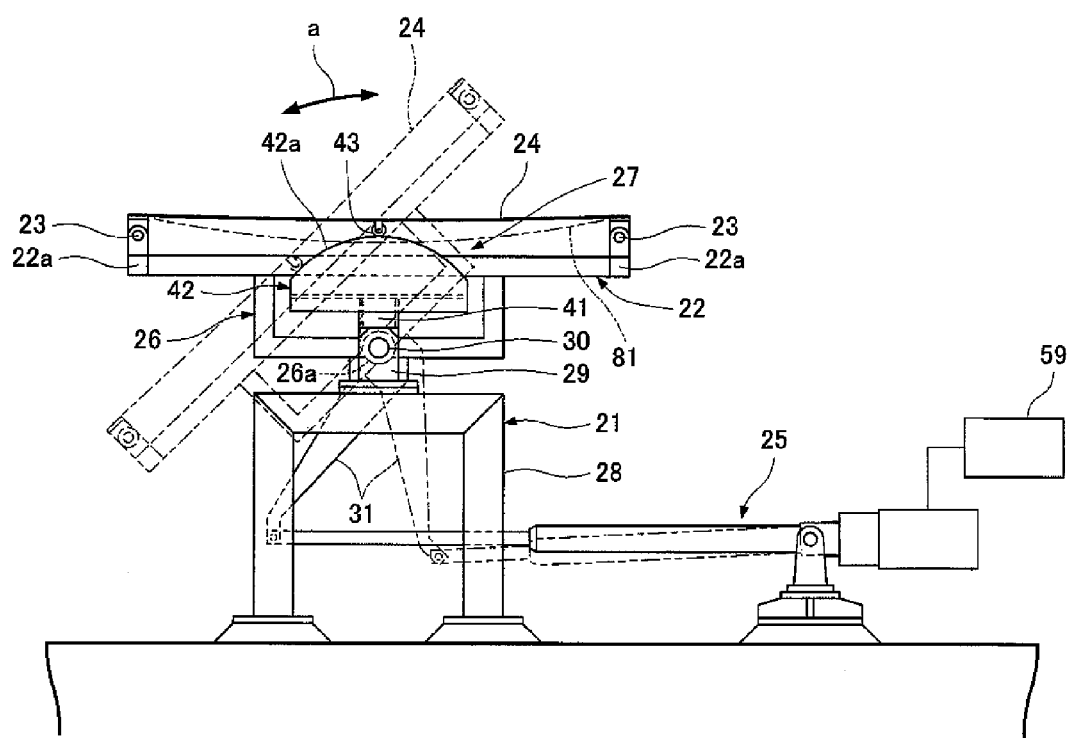

F I G. 7
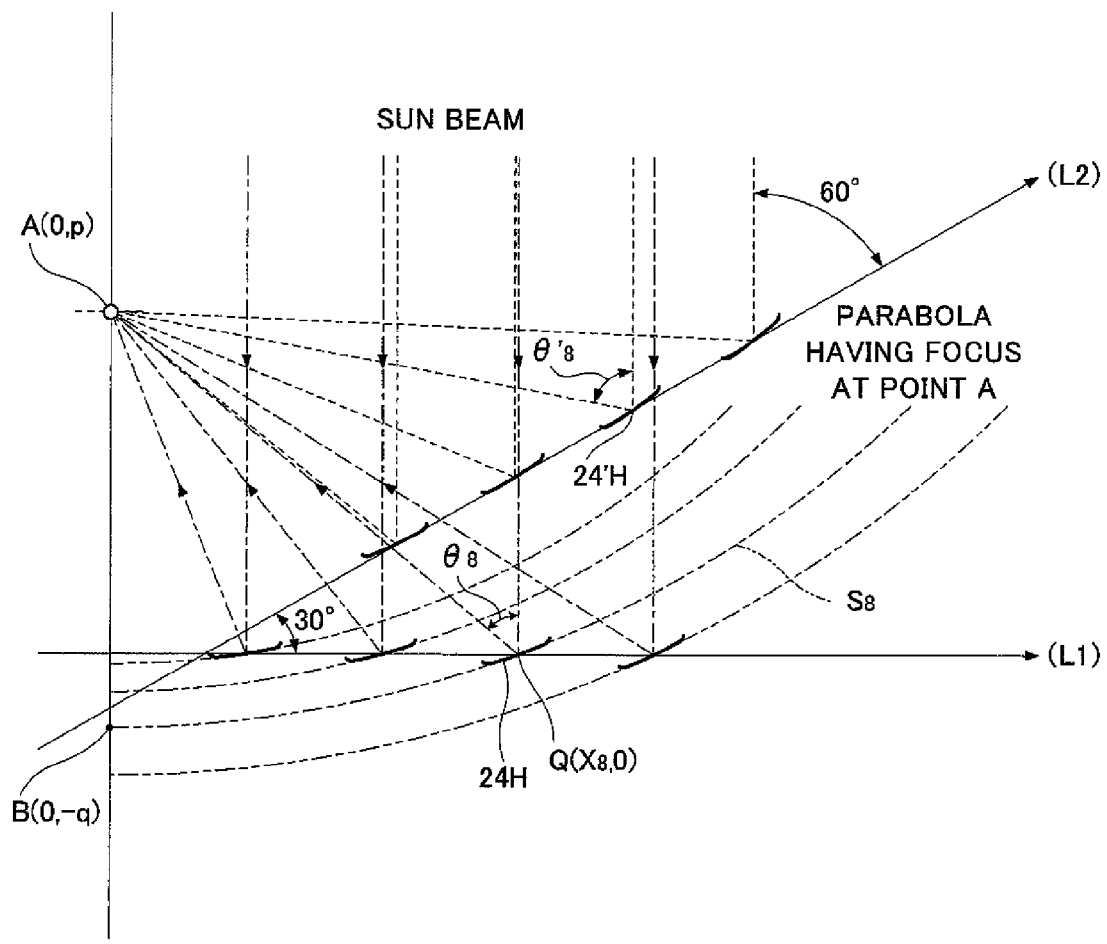

F I G. 2 5
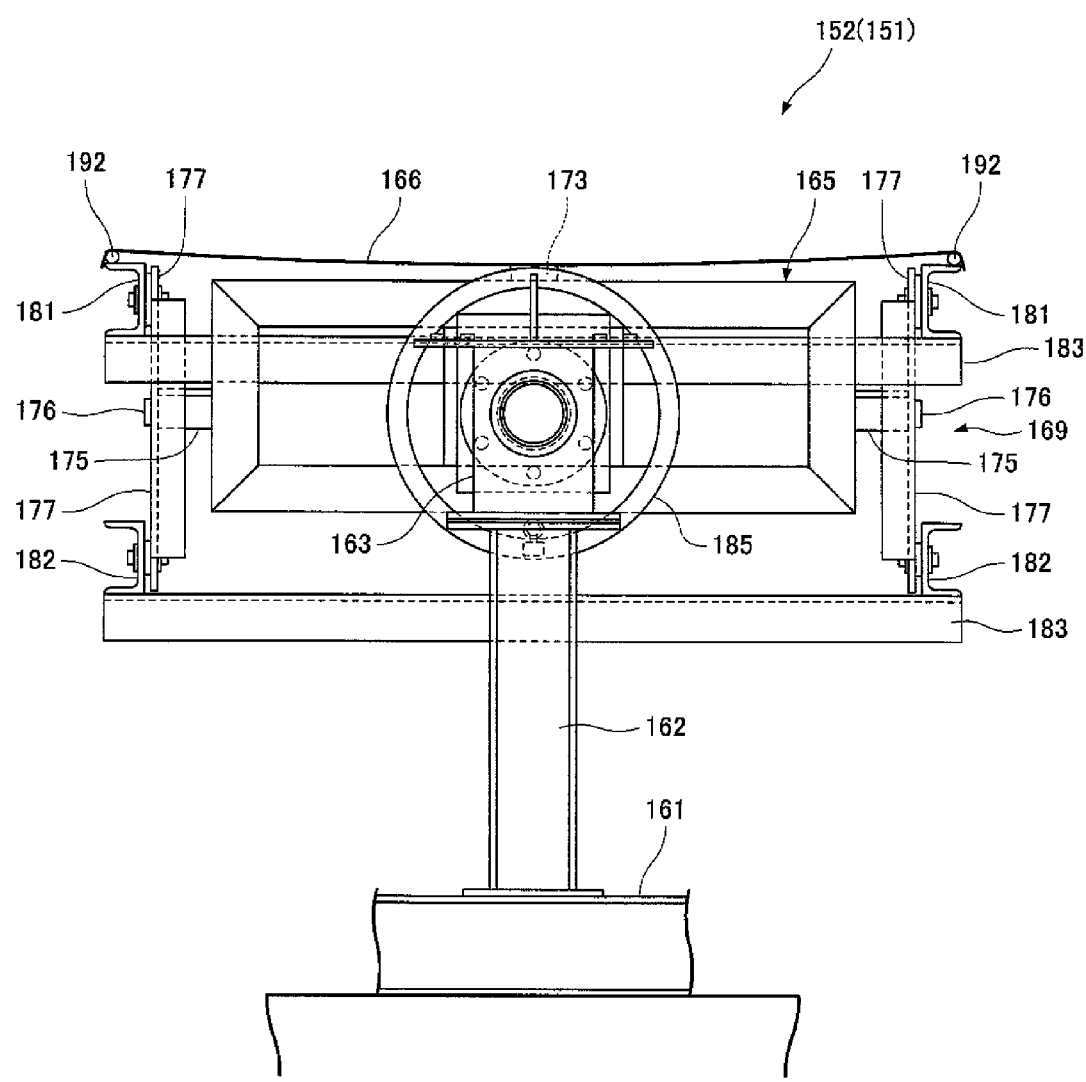

SOLAR LIGHT COLLECTING DEVICE AND SOLAR HEAT COLLECTING FACILITY

TECHNICAL FIELD

The present invention relates to a solar light collecting device and a solar heat collecting facility for collecting solar energy by means of collecting solar light to apply heat to fluidal heat carriers.

BACKGROUND ART

Facilities using solar energy efficiently include a facility in which multiple solar light reflecting mirrors are installed on the ground, solar light reflected by the reflecting mirrors is gathered on one point, and heat of the solar light is collected by a heat collecting device.

Such a facility includes multiple elongated reflecting mirrors each having a plain or slightly curved reflecting surface, the reflecting mirrors being installed on the ground side by side; and heat receiving pipe bodies (also referred to as receivers) disposed on the focal points of the reflecting surfaces of the reflecting mirrors to which fluidal heat carriers such as water are supplied. The fluidal heat carriers passing through the heat receiving pipe bodies are heated to collect heat (for example, see Patent Literature 1).

In the above-described facility, since the altitude in the east-west direction (hereinafter, referred to as the altitude) of the sun varies with time, light reflected by the reflecting mirrors naturally shifts from the focal points, thereby reducing solar heat collection efficiency. In order to prevent such a reduction in collection efficiency, the reflecting mirrors are set at such an angle that follows the altitude of the sun.

CITATION LIST

Patent Literature

Patent Literature 1: Japanese Unexamined Patent Application Publication No. 2008-503709

SUMMARY OF INVENTION

Technical Problem

As described above, the angle at which the reflecting mirrors are set is changed according to the altitude of the sun to constantly gather reflected light to the heat receiving pipe bodies. However, the degrees of curve of the reflecting surfaces of the reflecting mirrors are fixed. Disadvantageously, the degrees of curve of the reflecting mirrors are not always optimized even if the reflecting mirrors are set at such an angle that follows the altitude of the sun. Therefore, the improvement of efficiency in solar heat collection is desired.

Hence, an object of the present invention is to provide a solar light collecting device and a solar heat collecting facility which can improve collection efficiency when collecting solar heat with reflecting mirrors.

Solution to Problem

In order to solve the above-mentioned problem, a solar light collecting device of the present invention includes: a tilting body provided on a support frame so as to be tiltable in a vertical plane; a reflecting mirror which is supported by the tilting body, has a reflecting surface with a parabolic or quasi-parabolic cross section, and is capable of reflecting solar light to a heat collecting device; and a tilting device which tilts the tilting body according to the altitude of the sun to introduce the light reflected by the reflecting mirror to the heat collecting device disposed at the focal point of the reflecting surface, wherein the reflecting mirror is rectangular-shaped in plan view and is made of a flexible material, and the solar light collecting device further includes a curve adjusting device which is disposed below the reflecting mirror and changes the degree of curve of the reflecting surface of the reflecting mirror according to the tilting position of the tilting body. In the solar light collecting device, the stiffness of the reflecting mirror is varied in a cross section along the short sides of the reflecting mirror.

In the solar light collecting device, a frame-like body is formed as the tilting body to substantially have the same rectangular shape as the reflecting mirror and support the two side edges, that is, long sides of the reflecting mirror; and the curve adjusting device further includes: a roller disposed at the center on the rear surface of the reflecting mirror; and a guide body which is provided on the side of the support frame and is capable of changing the degree of curve of the reflecting surface of the reflecting mirror in contact with the roller.

Further, a bar-like body is provided as the tilting body to support the reflecting mirror, the bar-like body includes: a bar-like main support member which supports the center portion in parallel with the longitudinal direction of the reflecting mirror; and auxiliary support members which are provided on the two sides of the main support member at predetermined intervals so as to project obliquely upward, and the curve adjusting device includes: bar-like moving bodies which are movably supported by the auxiliary support members in the axial direction of the bar-like moving bodies; bar-like supporters which are joined with one ends of the bar-like moving bodies to support the side edges of the reflecting mirror; contact members which are provided on the other ends of the bar-like moving bodies; urging members which are provided on the bar-like moving bodies to urge the bar-like moving bodies toward the contact members; and guide bodies which are provided on the other end sides of the bar-like moving bodies and are capable of changing the degree of curve of the reflecting surface of the reflecting mirror by moving the bar-like moving bodies in contact with the contact members.

Moreover, a frame-like body is provided as the tilting body to support the reflecting mirror, and the curve adjusting device includes: a plurality of swing members which are swingably provided on the two sides of the frame-like body in the vertical plane; left and right support coupling members which couple the upper ends of the swing members on the two sides to each other and are capable of supporting the side edges of the reflecting mirror; coupling members which couple the left and right swing members to each other; bar-like moving bodies which are movably provided on the frame-like body and have one ends coupled to the coupling members; contact members which are provided on the other ends of the bar-like moving bodies; urging members which are provided on the bar-like moving members to urge the bar-like moving bodies toward the contact members; and a guide body which is capable of moving up or down the left and right support coupling members which couple the swing members to change the degree of curve of the reflecting surface of the reflecting mirror by contacting the contact members on the bar-like moving bodies to move the bar-like moving bodies to move up or down the left and right support coupling members.

A solar heat collecting facility of the present invention includes: the above-described solar light collecting devices placed side by side; and a heat collecting device disposed above the solar light collecting devices; wherein a curve adjusting device changes the degree of curve of the reflecting surfaces of the reflecting mirrors of the solar light collecting devices according to the altitude of the sun.

Advantageous Effects of Invention

In the above-described solar light collecting device and solar heat collecting facility, when collecting solar light with the reflecting mirrors and guiding the solar light to the heat collecting device, the reflecting mirrors can be tilted according to the altitude of the sun to constantly reflect the solar light to the heat collecting device and the degrees of curve of the reflecting surfaces of the reflecting mirrors can be adjusted to improve light collection efficiency, so that the reflected solar light can be efficiently introduced to the heat collecting device. Therefore, solar heat collection efficiency can be improved when solar heat is collected with the reflecting mirrors.

BRIEF DESCRIPTION OF DRAWINGS

FIG. 2 is a plan view schematically showing the configuration of the solar heat collecting facility according to the first embodiment.

FIG. 4 is a cross-sectional view of a solar light collecting device in the solar heat collecting facility according to the first embodiment.

FIG. 7 is a schematic diagram illustrating the principle of solar light collection with a reflecting mirror in the solar light collecting device according to the first embodiment.

FIG. 25 is a view taken along the arrows K-K of FIG. 23.

DESCRIPTION OF EMBODIMENTS

The following will describe a solar light collecting device and a solar heat collecting facility according to the present invention in reference to specific embodiments.

The solar heat collecting facility comprises a plurality of solar light collecting devices. Therefore, the solar light collecting devices will be described as devices to be provided on the solar heat collecting facility.

First Embodiment

First, the configuration of a solar heat collecting facility according to a first embodiment of the present invention will be schematically described.

Figure 1:
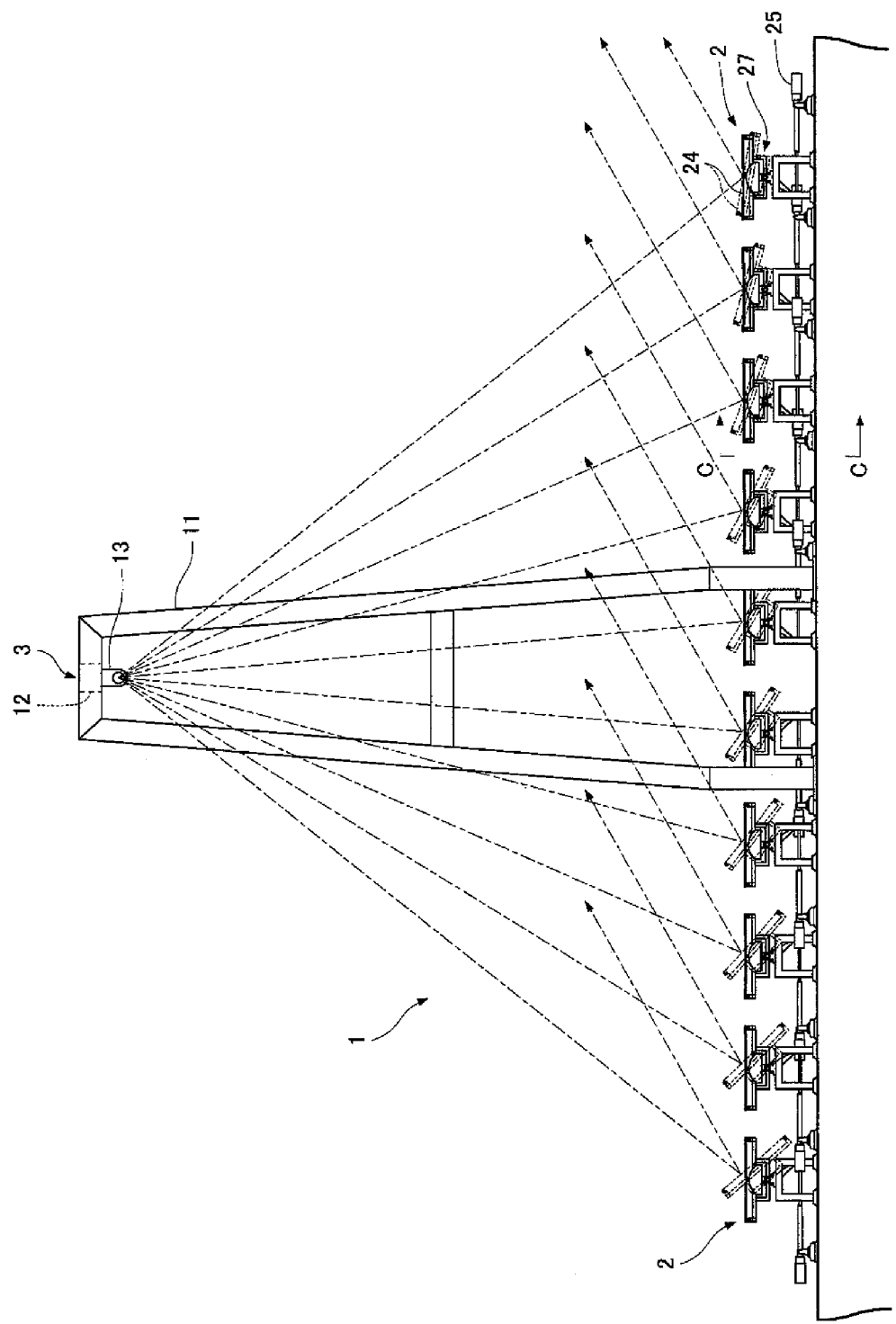
FIG. 1 is a side view schematically showing the configuration of a solar heat collecting facility according to a first embodiment of the present invention.
Figure 3:
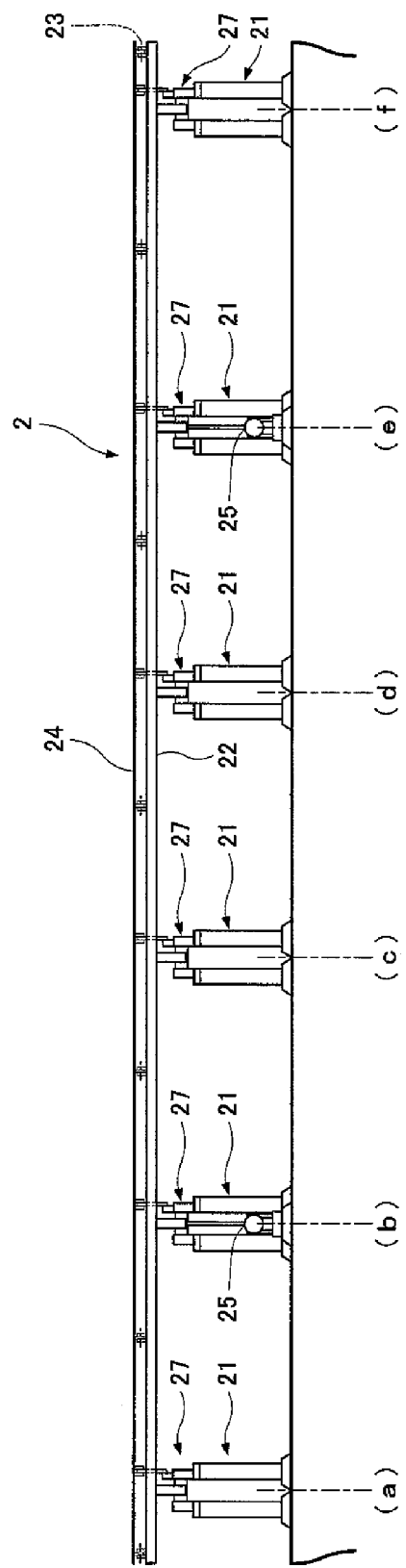
FIG. 3 is a view taken along the arrows C-C of FIG. 1.
Figure 5:
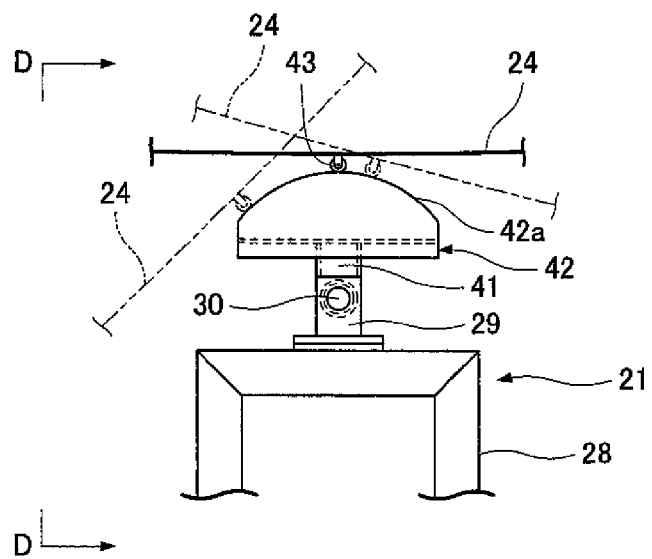
FIG. 5 is an enlarged view of the principal part in FIG. 4.
Figure 6:
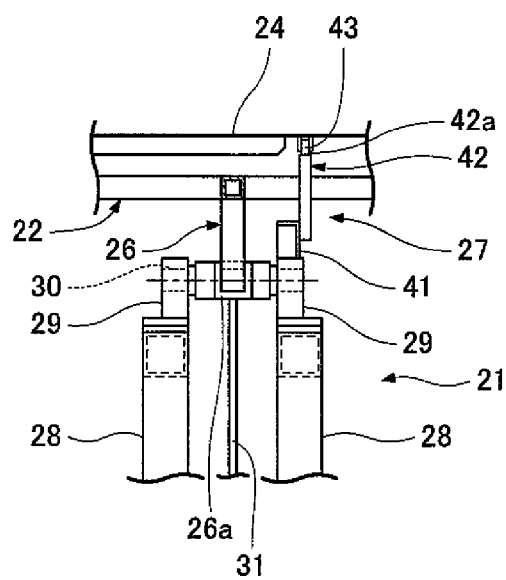
FIG. 6 is a view taken along the arrows D-D of FIG. 5.

As shown in FIGS. 1 to 3, a solar heat collecting facility 1 includes: a number of (for example, ten) Fresnel-type solar light collecting devices 2 which respectively have a reflecting mirror for reflecting solar light (a sun beam) on a spacious ground; and a heat collecting device which collects the thermal energy of solar light by heating fluidal heat carriers such as water, chlorofluorocarbon, oil, and molten salt to a high temperature with solar light reflected by the solar light collecting devices 2.

As will be described later, the reflecting mirror used for the solar light collecting device is rectangular-shaped and long in a predetermined direction. The reflecting mirror defines a quasi-parabola (as a matter of course, a parabola is acceptable) in a surface (cross section) taken in parallel with the shorter side of the reflecting mirror. That is, the overall reflecting surface forms a quasi-parabolic surface (a parabolic surface in the case where the cross section has a parabola). In other words, the reflecting mirror is shaped like a shallow gutter. Hereinafter, the longitudinal direction of the reflecting mirror corresponds to the north-south direction and will be referred to as the front-back direction when the configurations of devices are described.

Five solar light collecting devices 2 are disposed on each of the left and right sides of the heat collecting device 3. The solar light collecting devices 2 on the left and right sides are parallel to each other. Ordinal numbers 1 to 10 will be assigned to the solar light collecting devices 2 sequentially from left to right in FIG. 1 to specify the positions of the devices for an explanation.

The heat collecting device 3 has a double-pipe structure composed of a transparent protective pipe and a transfer pipe which is disposed in the transparent protective pipe and is coated with black or made of a black material. Fluidal heat carriers such as water, chlorofluorocarbon, oil, and molten salt pass through the transfer pipe.

The heat collecting device 3 includes: a pair of front and back pillar members 11; a horizontal connecting member 12 which connects the upper ends of the pillar members 11; and a heat collecting pipe body 13 (may be referred to as a heat receiving pipe body or a receiver) held by the horizontal connecting member 12 and having the double-pipe structure composed of the protective pipe and the transfer pipe. As a matter of course, the heat collecting pipe body 13 is disposed in the front-back direction and at the center in the left-right direction, that is, above and at the intermediate point between the fifth solar light collecting device 2 (2E) and the sixth solar light collecting device 2 (2F). The heat collecting pipe body 13 may be, for example, a vacuum insulation tube with a semicircular reflecting mirror surface provided on the top thereof.

Solar light reflected by the solar light collecting devices 2 is caused to converge on the focal point of the quasi-parabolic surface (hereinafter, referred to as a quasi-parabola in the case of a cross section) as much as possible. As a matter of course, the heat collecting pipe body 13 of the heat collecting device 3 is disposed on the above-described focal point.

As schematically shown in FIGS. 1 to 6, the solar light collecting device 2 includes: strut bodies 21 which are disposed in multiple points [for example, six points (a) to (f)] in the front-back direction; a frame-like body 22 which is rectangular-shaped in plan view and serves as a tilting body supported by the strut bodies 21 so as to be tilted in a vertical plane along the left-right direction; a flexible reflecting mirror 24 which is rectangular-shaped and held at least by left and right side edges 22a of the frame-like body 22 via mounting pins 23; and tilting cylinder devices 25 (which are an example of a tilting device and referred to as tilting equipment and may be specifically an electric cylinder, a hydraulic cylinder, or a pneumatic cylinder) which tilt the frame-like body 22 in the vertical plane. The tilting cylinder devices 25 are disposed, for example, at two points in the front-back direction (may be at three or more points or at one point in the center). For example, the tilting cylinder devices 25 are disposed so as to correspond to the strut bodies 21(b) and 21(e) which are located second from the outer sides. The strut bodies 21 may be referred to as support frames.

The reflecting mirror 24 may be a thin metal sheet with mirrored surfaces, a thin sheet subjected to surface treatment such as plating and vapor deposition, or a thin sheet with specular films bonded thereto.

The strut body 21 includes a pair of front and back gate-like strut members 28 and a horizontal support shaft 30 which is disposed on the strut members 28 in the front-back direction via a support bracket 29. A U-shaped leg portion 26 in side view provided on the underside of the frame-like body 22 is supported by the horizontal support shaft 30. In other words, the frame-like body 22 which holds the reflecting mirror 24 is supported by the horizontal support shaft 30 so as to be tilted in the vertical plane along the left-right direction. A lever 31 is provided on a boss section 26a of the leg portion 26 supported by the horizontal support shaft 30. The tilting cylinder device 25 is connected with the leading end of the lever 31. Therefore, the frame-like body 22, that is, the reflecting mirror 24 is tilted in the vertical plane along the left-right direction via the lever 31 as indicated by arrow a in FIG. 4, by operating the tilting cylinder device 25.

In addition, as described above, the reflecting mirror 24 is composed of a flexible material such that the degree of curve of the quasi-parabolic surface, that is, the reflecting surface of the reflecting mirror 24 is automatically varied according to the tilting position of the reflecting mirror 24. That is, a curve adjusting device (also referred to as curve adjusting equipment) 27 for adjusting the degree of curve of the reflecting surface is disposed on each strut body 21 so as to constantly introduce the reflected light to the heat collecting pipe body 13 even if the reflecting mirror 24 is tilted.

The curve adjusting device 27 includes a cam plate 42 (an example of a guide body) and a deflection adjusting roller 43 (a cam follower). The cam plate 42 is mounted via a mounting bracket 41 to the support bracket 29 on one of the strut members 28 which constitutes the strut body 21 and has a guide face 42a on top thereof. The deflection adjusting roller 43 is provided at the center in the width direction of the rear surface (undersurface) of the reflecting mirror 24, and is capable of adjusting the amount of the rear surface of the reflecting mirror 24 deflected by being pressed toward the front surface (top surface) while being guided by the cam plate 42.

The degree of curve of the reflecting surface, that is, the quasi-parabolic surface of the reflecting mirror 24 will be described below.

As described above, the ten reflecting mirrors 24 are disposed at predetermined intervals along the left-right direction. The degree of curve will be described with a focus on the third reflecting mirror on the right side from the center, that is, the reflecting mirror 24 (24H) of the eighth solar light collecting device 2 (2H).

The reflecting mirror 24H is disposed, as shown in FIG. 7, on a horizontal line (L1) on the strut body 21 (equivalent to the horizon) and a parabola $S_8$ having a focus at the installation position (point A) of the heat collecting pipe body 13. In the case where the installation position (center position) Q of the reflecting mirror 24 is set as $(X_8, 0)$; the position of the point A as the focus of the parabola $S_8$ (hereinafter, will be referred to as the focus A) is set as $(0, p)$; and a position B where the parabola $S_8$ crosses the y-axis is set as $(0, -q)$, the parabola $S_8$ is represented by the equation (1) below. The same equation can be applied to the other reflecting mirrors 24 [only the value of the x-coordinate $(X_1)$ is replaced].

$$y = x^2/4(p+q) - q \tag{1}$$

wherein q is a value obtained by substituting $X_8$ into x and zero into y in the equation (1).

In addition, when solar light (a sun beam) is incident from due south (90 degrees), that is, directly above, the reflecting mirror 24H is tilted such that the tilt of the reflecting mirror 24H is substantially equal to the parabola $S_8$ represented by the equation (1) and is adjusted by the curve adjusting device 27 so as to be substantially equal to the curvature of the parabola $S_8$ in this position. The crossing angle formed by the incident direction and reflection direction of solar light at this point is indicated by $\theta_8$.

In order to represent the degree of curve of the reflecting surface by an equation, the degree of curve will be described as curvature (actually, the curvature slightly differs between points on the cross-section of the reflecting surface).

The curvature is the reciprocal of curvature radius R. The curvature radius R is represented by the equation (2) below:

$$R = \frac{\left\{1 + \left(\frac{dy}{dx}\right)\right\}^{\frac{3}{2}}}{\frac{d^2 y}{dx^2}} \tag{2}$$

Further, the curvature radius of the reflecting mirror 24 in the vicinity of the vertex of the parabola is about twice the shortest distance between the focus A (0, p) and the installation position Q ($X_8$, 0) of the reflecting mirror 24H.

The following will describe conditions for light reflected by the reflecting mirror 24 to be incident on the focus A, for example, when the sun moves by 30 degrees to the west from due south with time [when the sun is tilted by 60 degrees relative to the horizontal line (L1)].

When the sun moves by 30 degrees to the west, as indicated by straight line (L2) in FIG. 7 (that is, the horizon tilted by 30 degrees), the crossing angle formed by the incident direction of solar light (a sun beam) and the reflection direction of the solar light toward the focus A becomes $θ_8'$. Therefore, the orientation and degree of curve of the reflecting mirror 24H on the horizontal line (L1) are adjusted such that the angle of $θ_8'$ is kept and the reflected light can pass through the focus A, that is, such that the tilting position and degree of curve (curvature) of a reflecting mirror 24'H on the straight line (L2) are kept.

Specifically, when the reflecting mirror 24H is tilted at the crossing angle $θ_8'$ from the previous crossing angle $θ_8$, the deflection adjusting roller 43 provided on the rear surface of the reflecting mirror 24H is guided by the cam face 42a of the cam plate 42, so that the amount of deflection of the reflecting mirror 24H is varied and the curvature of the reflecting surface of the reflecting mirror 24H is brought closer to that represented by the equation (2).

Therefore, the cam face 42a of the cam plate 42 is set such that, in the installation position of the reflecting mirror 24, the degree of curve of the reflecting surface can be obtained to have the reflected light converge on the focus A as much as possible when the sun moves.

Figure 8:
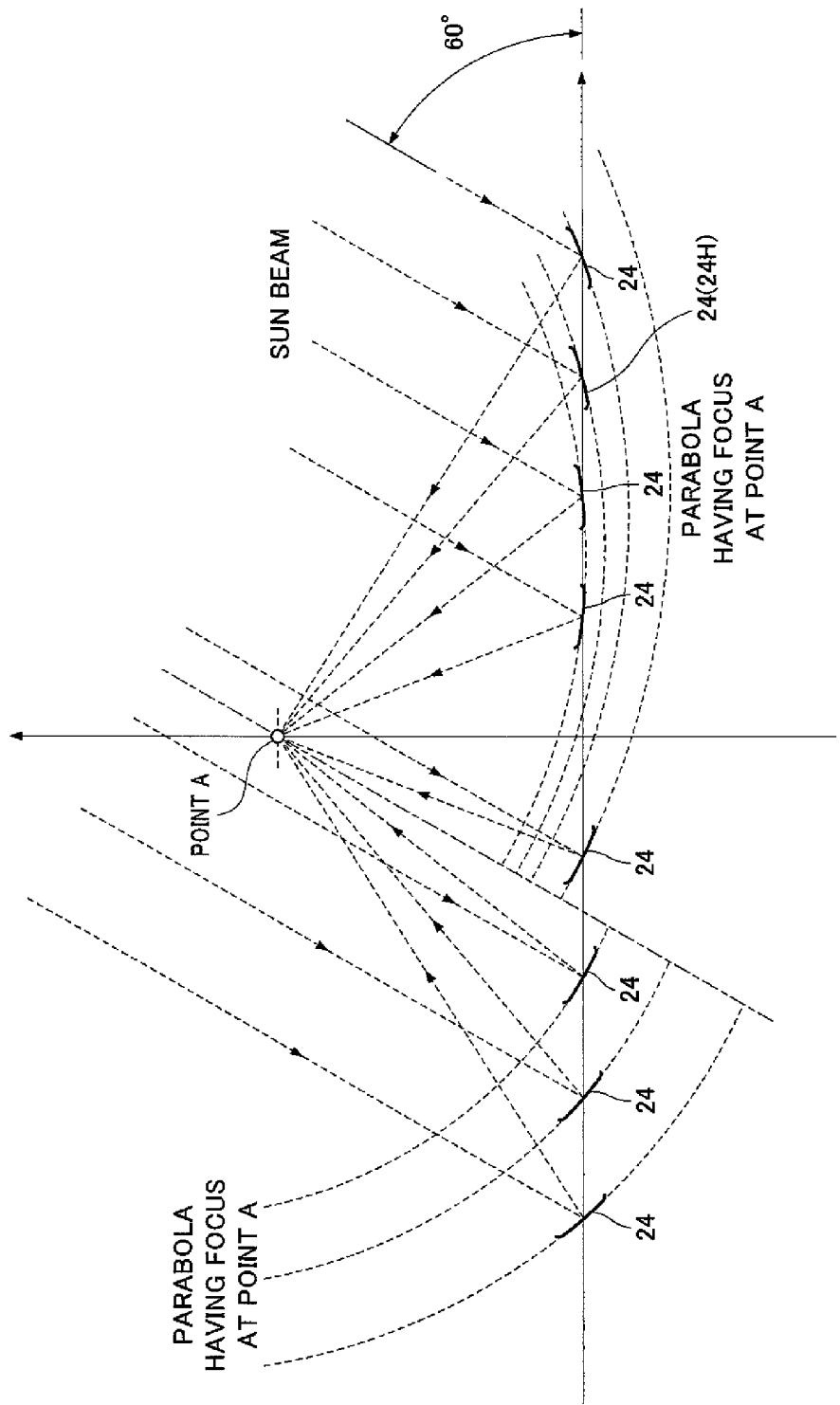
FIG. 8 is a schematic diagram showing the state of solar light collection with the reflecting mirror in the solar light collecting device according to the first embodiment.
Figure 9:
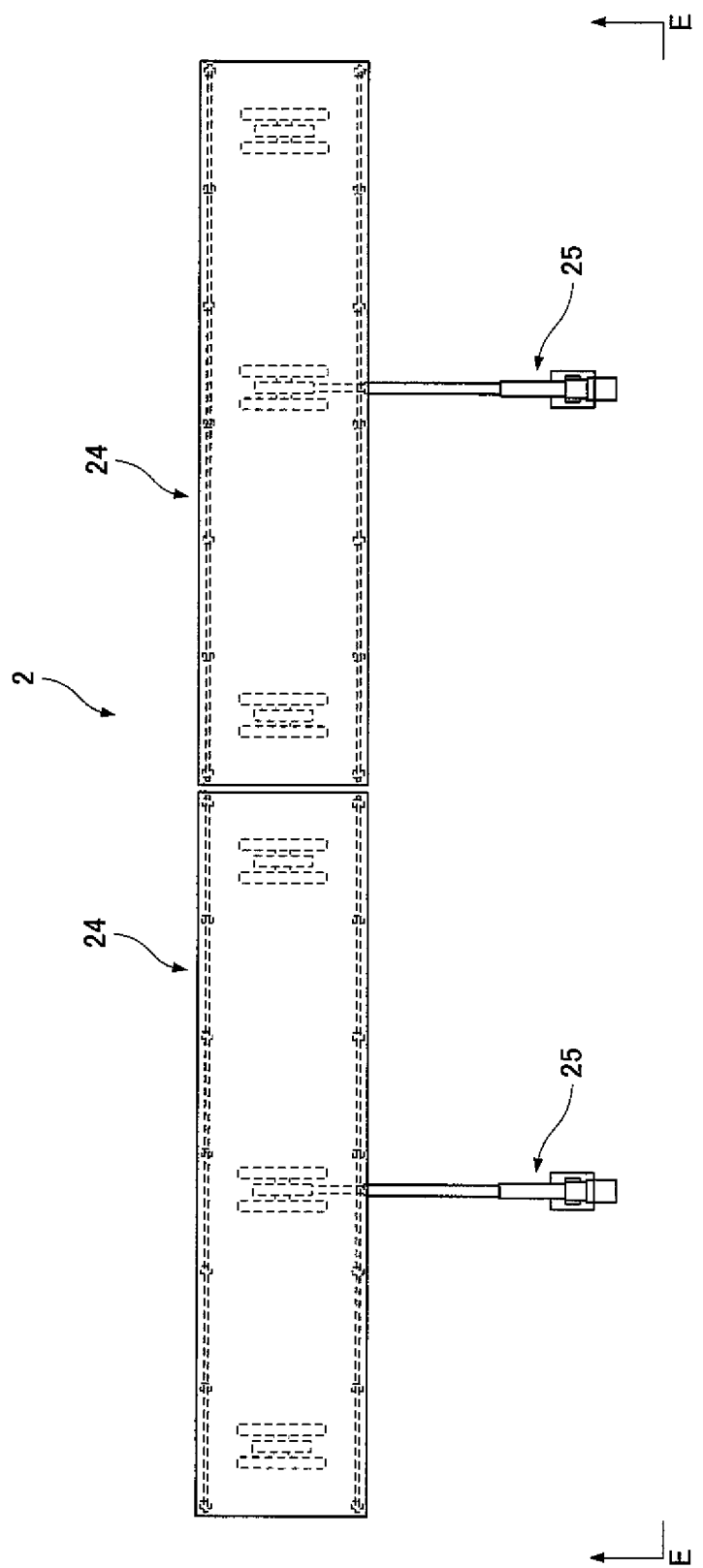
FIG. 9 is a plan view of a solar light collecting device according to a second embodiment of the present invention.
Figure 10:
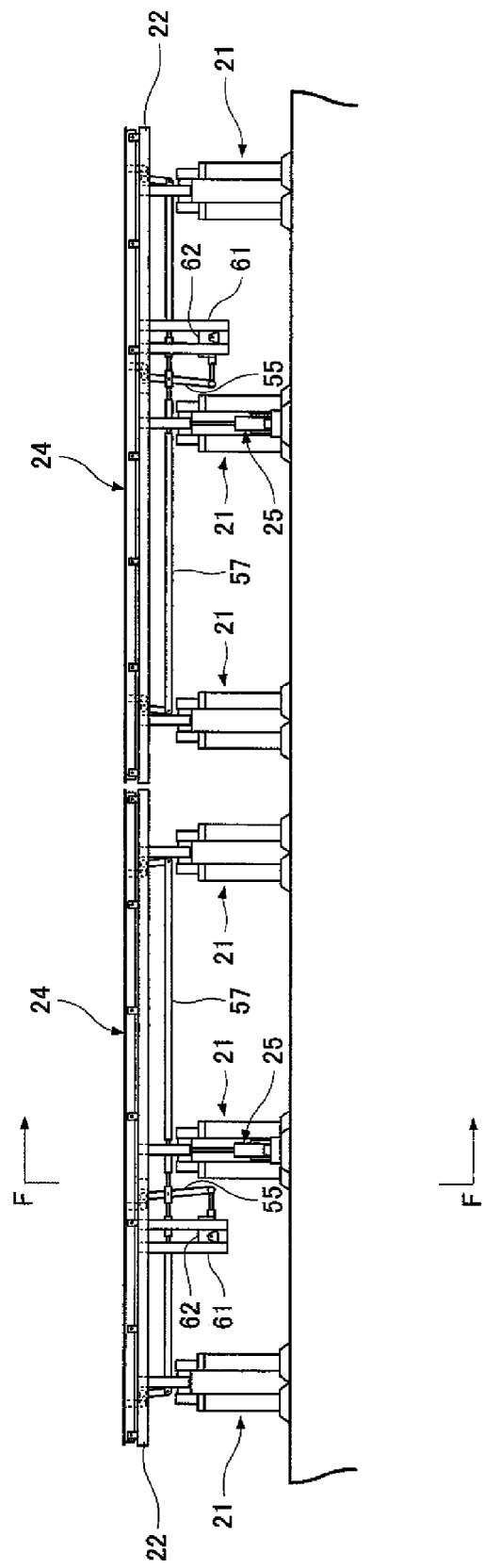
FIG. 10 is a view taken along the arrows E-E of FIG. 9.
Figure 11:
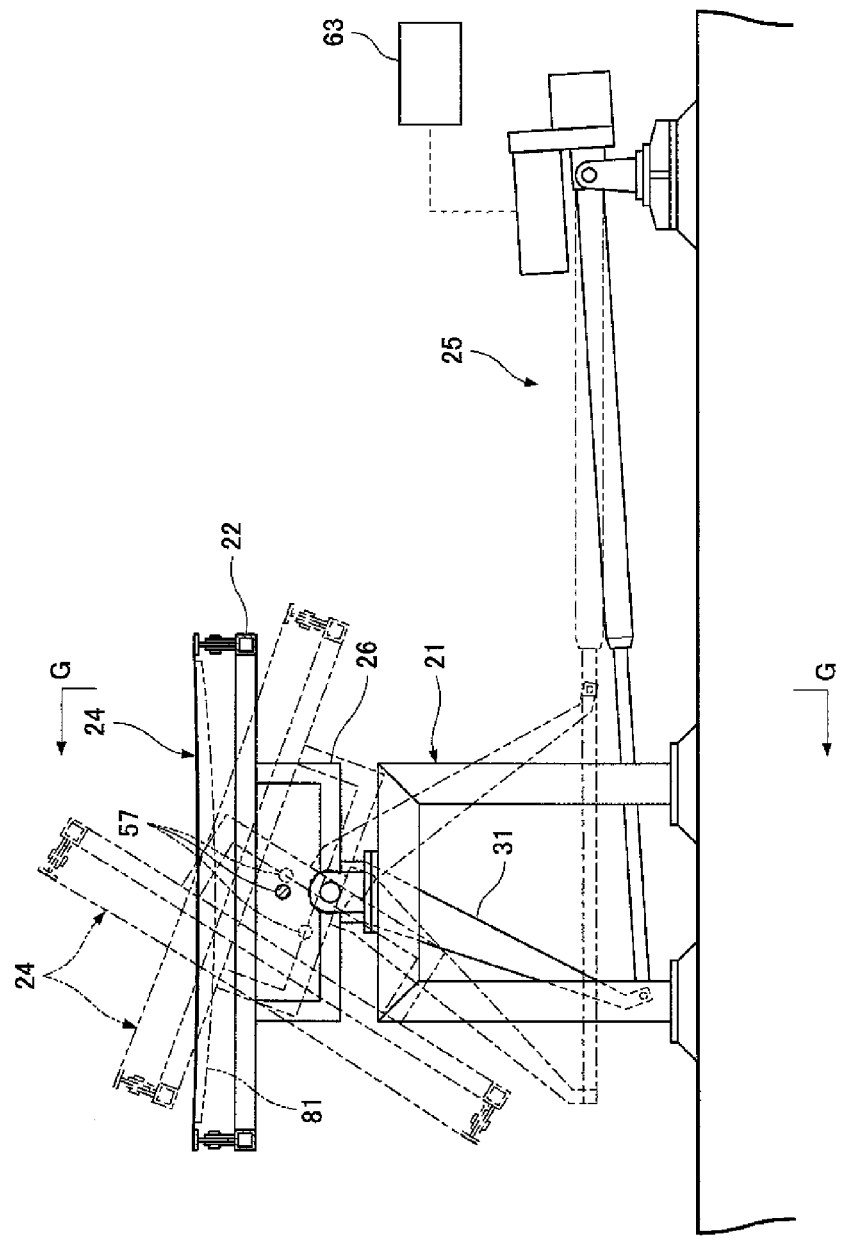
FIG. 11 is a cross-sectional view taken along the lines F-F of FIG. 10.
Figure 12:
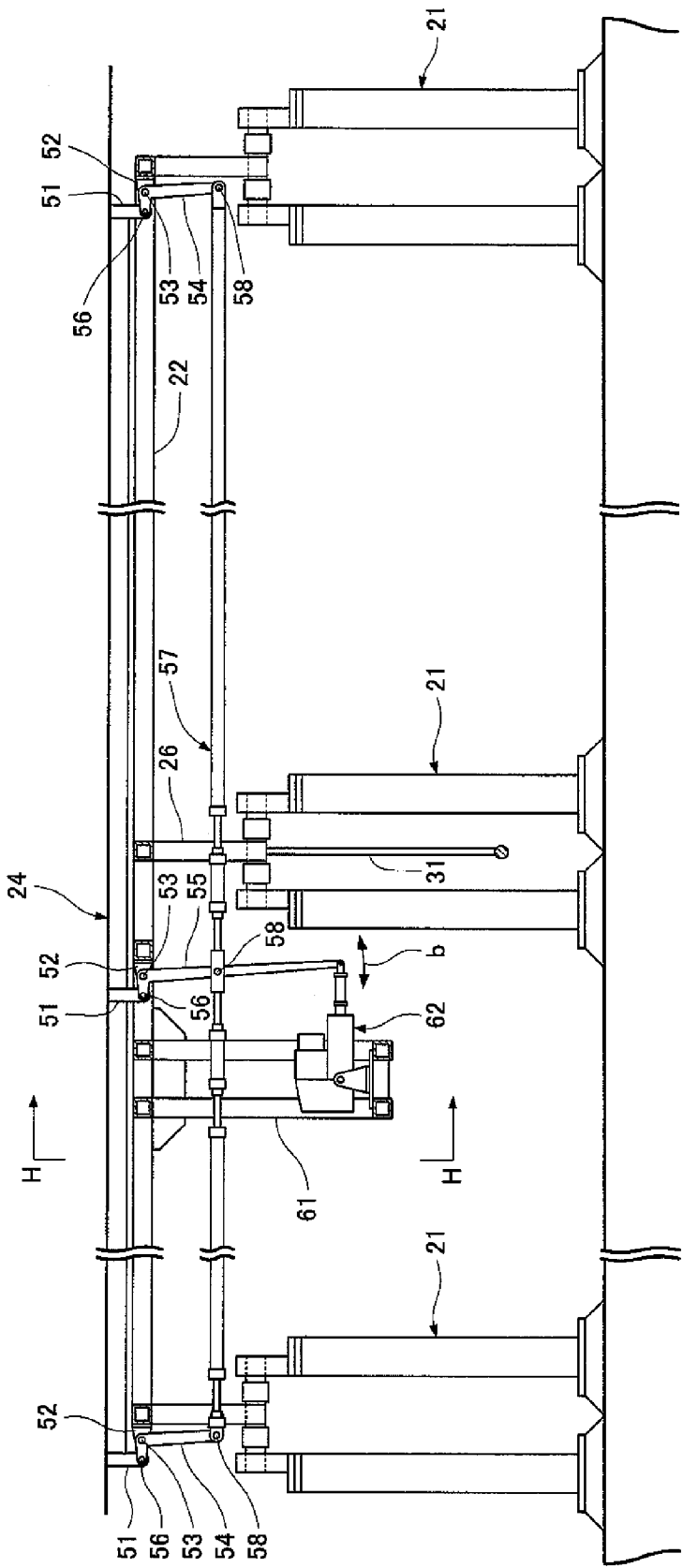
FIG. 12 is a view taken along the arrows G-G of FIG. 11.
Figure 13:
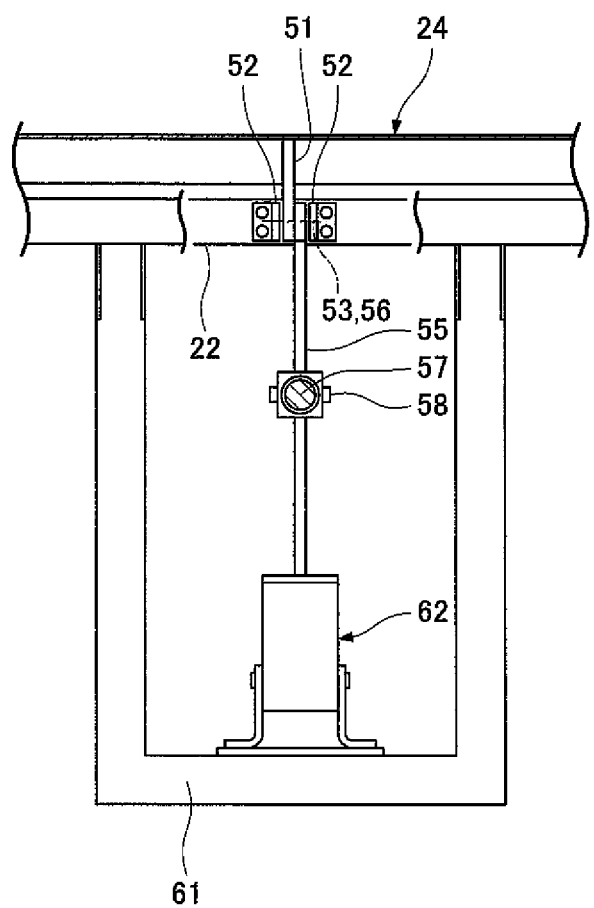
FIG. 13 is a view taken along the arrows H-H of FIG. 12.

FIG. 8 illustrates the orientations of the reflecting mirrors 24 when the sun has moved by 30 degrees to the west, that is, the sun is tilted by 60 degrees relative to the horizon.

The tilting cylinder device 25 includes a controller 59 containing control data to control the tilting position of the reflecting mirror 24 according to the altitude of the sun.

The collecting operation of the solar heat collecting facility 1 will be described below.

For the sake of simplicity, it is assumed that the sun is positioned due south.

In this situation, since solar light (a solar beam) is incident from due south, the tilting positions of the reflecting mirrors 24 are adjusted such that the reflected light passes through the focus A of parabolas S, while the degrees of curves (curvature) of the reflecting mirrors 24 are adjusted by the cam plates 42. The curve of the reflecting mirror 24 reaches a maximum when the reflecting mirror 24 is positioned at the vertex of the parabola, that is, the sun, the reflecting mirror 24, and the heat collecting pipe body 13 are aligned with each other, in other words, the solar light is incident at a right angle to the reflecting mirror 24.

When the altitude of the sun decreases with time, that is, when the sun moves to the west, as a matter of course, the focus of each reflecting mirror 24 is shifted. However, the tilting cylinder devices 25 are driven by the controllers in order to tilt the reflecting mirrors 24 such that the foci of the reflecting mirrors 24 substantially coincide with the heat collecting pipe body (the previous position of the foci).

At this point, the deflection adjusting roller 43 moves along the cam face 42a of the cam plate 42 according to the tilt of the reflecting mirror 24, so that the rear surface of the reflecting mirror 24 is pushed upward and the degree of curve (curvature) of the reflecting mirror is reduced. That is, the degree of curve of the reflecting surface of the tilted reflecting mirror 24 is adjusted such that reflected solar light converges on the focus A. In other words, the orientations of the reflecting mirrors 24 and the degrees of curve of the reflecting surfaces are optimized according to the altitude of the sun.

A specific example of the reflecting mirror 24 will be described below. The reflecting mirror 24 is a steel sheet with a thickness of 3.2 mm to which a high reflective film mirror with a thickness of 0.025 mm is bonded. The steel sheet is 10 meters in length (north-south direction) and 1.2 meters in width in the left-right direction (east-west direction). In addition, the heat collecting pipe body 13 is installed at a height of 10 meters.

As described above, when fluidal heat carriers are heated with solar light collected by the reflecting mirrors, the reflecting mirrors are tilted according to the altitude of the sun, so that the solar light is reflected to the heat collecting pipe body and the degrees of curve of the reflecting surfaces of the reflecting mirrors are adjusted to improve light collection efficiency. Hence, the reflected solar light can be efficiently guided to the heat collecting pipe body at any time. Therefore, heat collection efficiency can be further improved when collecting the heat of solar light by the reflecting mirrors.

Second Embodiment

In the first embodiment, the curve adjusting device 27 presses and urges, with the cam plate 42, the rear surface at the center of the reflecting mirror 24 held by the frame-like body 22 upward. However, the curve adjusting device 27 may, for example, push or pull the rear surface at the center of the reflecting mirror 24.

This configuration will be briefly described as a second embodiment with reference to FIGS. 9 to 13.

In the second embodiment, a reflecting mirror 24 is divided into two pieces in the front-back direction. It is described with a focus on one of the pieces in the second embodiment. As a matter of course, the reflecting mirror 24 may be a single sheet without being divided into two pieces, as shown in FIG. 3.

That is, projected pieces 51 are provided at a plurality of points in the front-back direction of the reflecting mirror 24, for example, at three points of the front and back ends and the center thereof. The projected pieces 51 are downwardly projected. The folded portions of L-shaped levers 54 and 55 in side view are rotatably supported by mounting brackets 52 which are provided in positions of a frame-like body 22 corresponding to the projected pieces 51, via horizontal support pins 53 along the left-right direction. One ends of the levers 54 and 55, that is, the upper ends thereof are coupled with the projected pieces 51 via coupling pins 56.

The other ends of the levers 54 at the front and back ends of the reflecting mirror 24 are reduced in length and the other end of the lever 55 at the center of the reflecting mirror 24 is increased in length. In addition, the other ends of the levers 54 and the intermediate portion of the lever 55 are coupled to each other by a long coupling rod 57 via connecting pins 58.

Furthermore, a swing cylinder device 62 (for example, an electric cylinder) is provided in the position of the frame-like body 22 corresponding to the center lever 55 via a support portion 61. The swing cylinder device 62 swings the center lever 55 within a predetermined angle.

When the center lever 55 is swung along the direction of arrow b by the operation of the swing cylinder device 62, the center bottom of the reflecting mirror 24 is pushed or pulled vertically, so that the degree of curve of the cross section of the reflecting surface is varied.

As a matter of course, a controller 63 is provided for the above-described cylinder device 62. Similarly to the above-described first embodiment, the controller 63 adjusts the degree of curve of the reflecting mirror 24 according to the tilting position of the reflecting mirror 24, so that the reflected light converges on a heat collecting pipe body 13.

Third Embodiment

In the first embodiment, the curve adjusting device 27 presses and urges, with the cam plate 42, the rear surface at the center of the reflecting mirror 24 held by the frame-like body 22 upward. However, the degree of curve of the reflecting mirror may be adjusted, for example, by pulling two side edges of the reflecting mirror to which a predetermined curve (a large curve) is applied in the left-right direction to vary the distance between the side edges.

Figure 14:
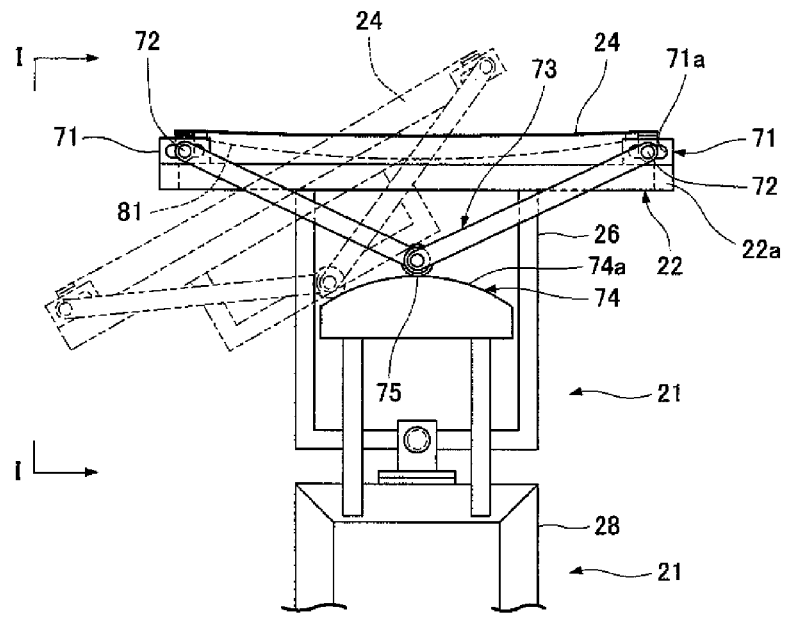
FIG. 14 is a side view showing the configuration of a solar light collecting device according to a third embodiment of the present invention.
Figure 15:
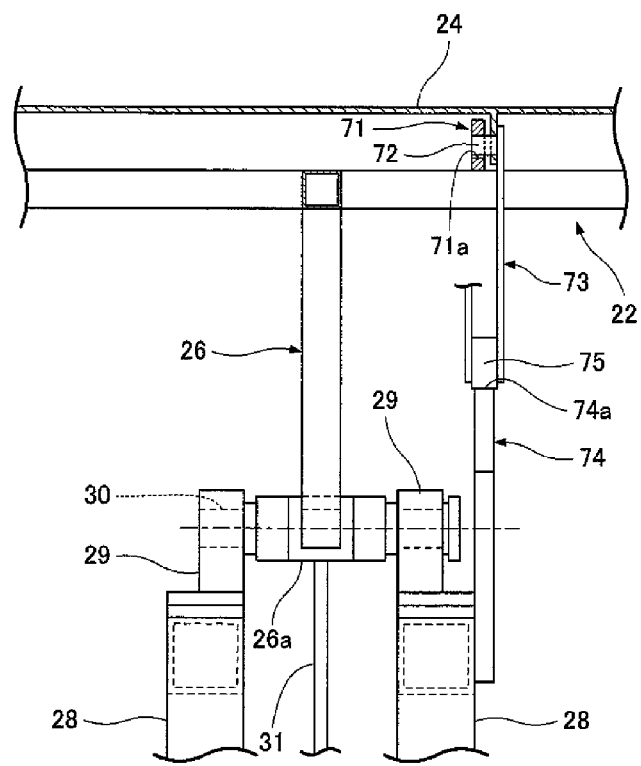
FIG. 15 is a cross-sectional view taken along the lines I-I of FIG. 14.
Figure 16:
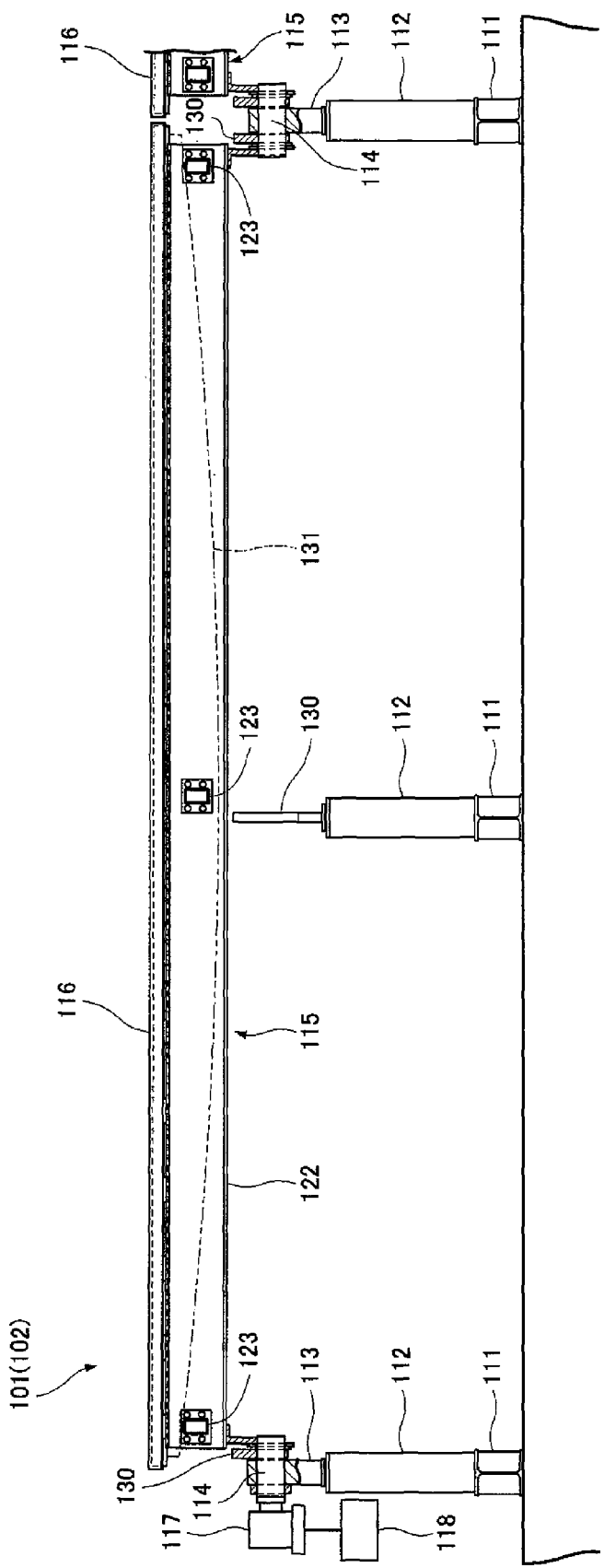
FIG. 16 is a side view of a solar light collecting device according to a fourth embodiment of the present invention.
Figure 17:
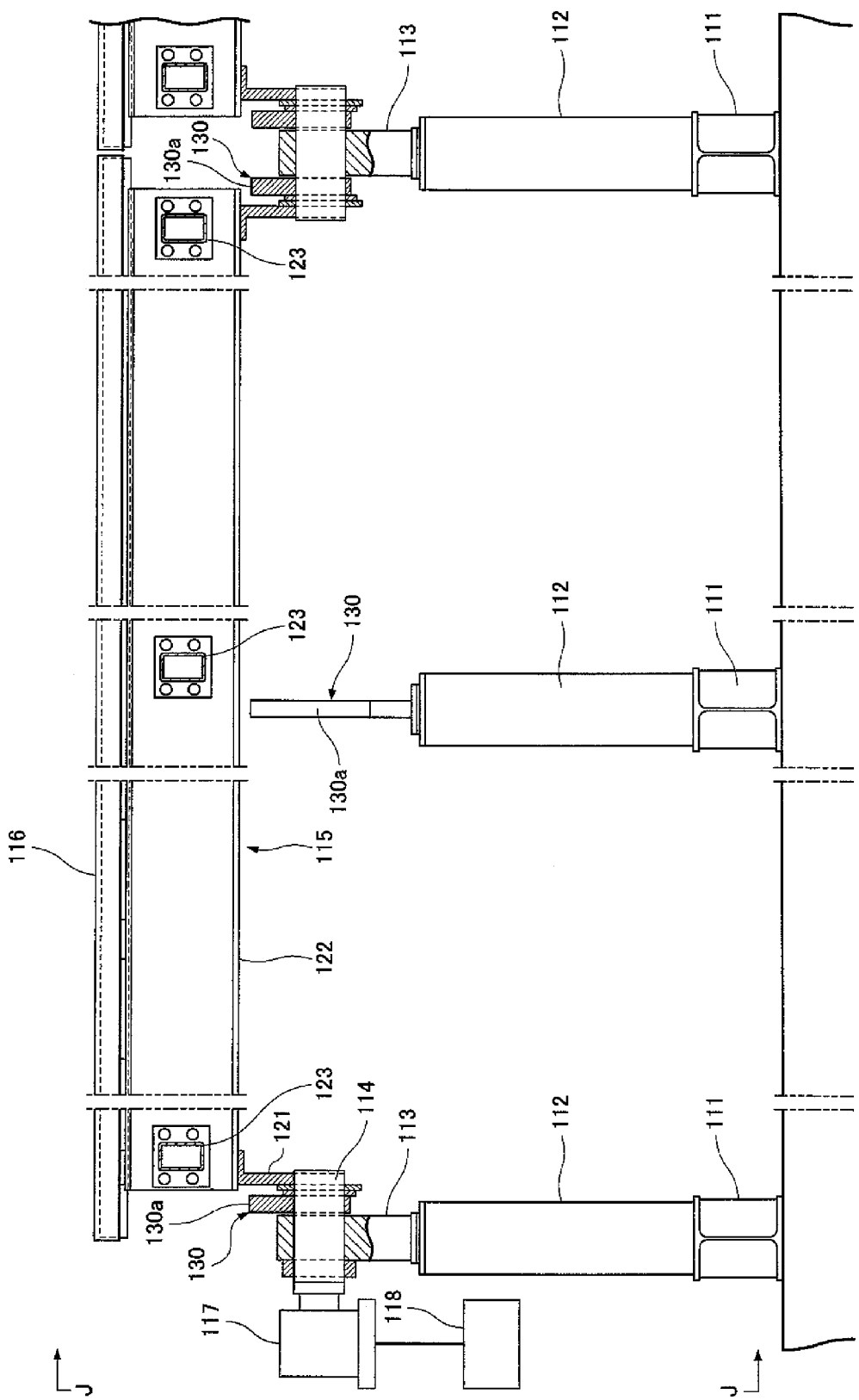
FIG. 17 is a side view enlargedly showing the principal part of the solar light collecting device according to the fourth embodiment.
Figure 18:
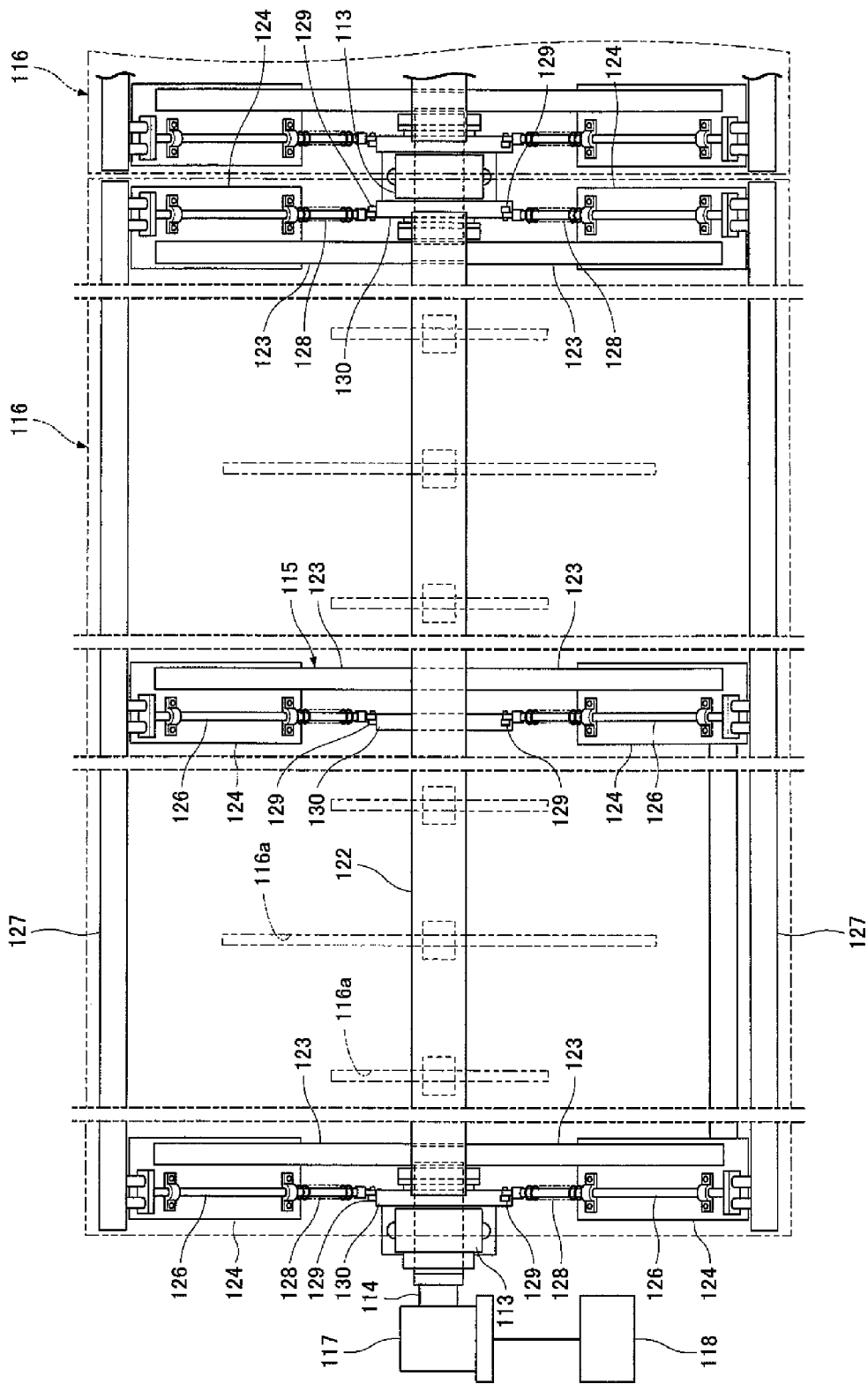
FIG. 18 is a partially omitted plan view of the solar light collecting device according to the fourth embodiment.
Figure 19:
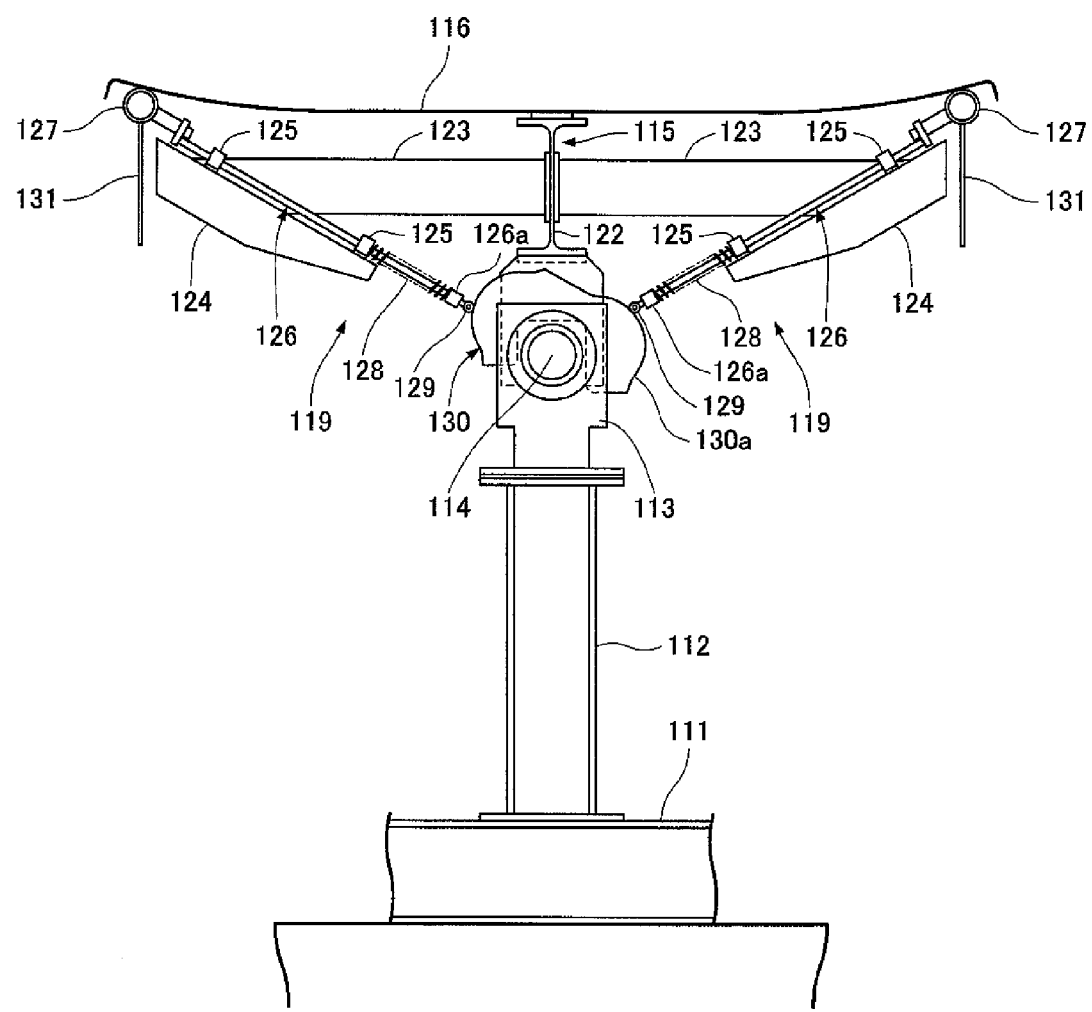
FIG. 19 is a view taken along the arrows J-J of FIG. 17.
Figure 20:
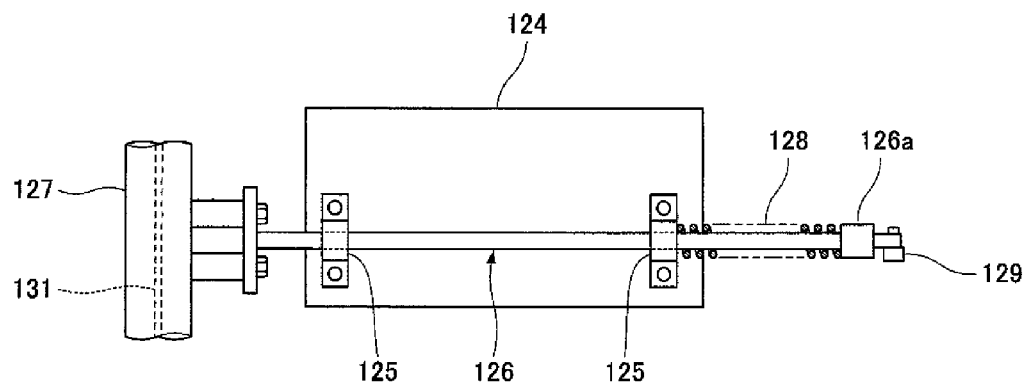
FIG. 20 is a plan view showing the principal part of a curve adjusting device in the solar light collecting device according to the fourth embodiment.
Figure 21:
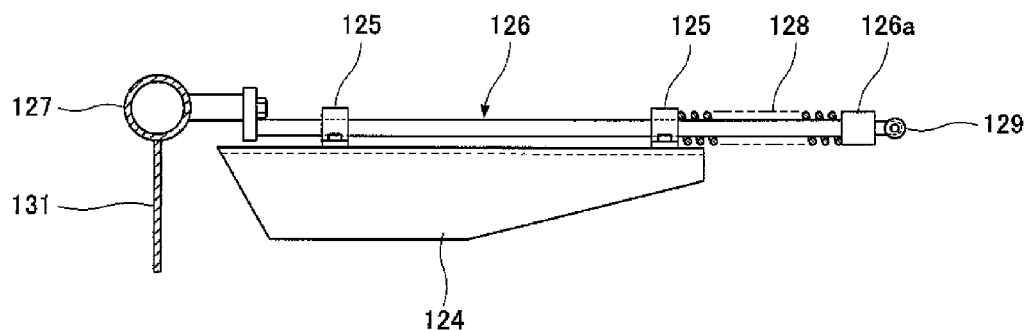
FIG. 21 is a side view showing the principal part of the curve adjusting device in the solar light collecting device according to the fourth embodiment.
Figure 22:
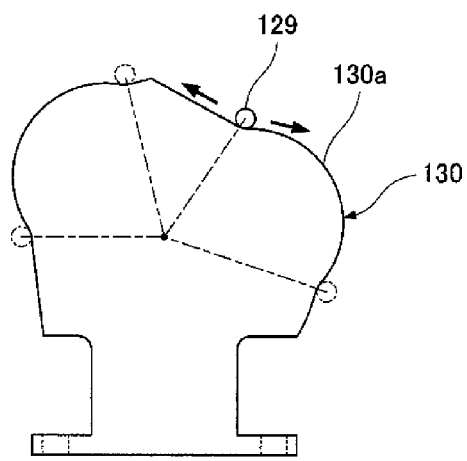
FIG. 22 is a side view of a cam plate in the curve adjusting device according to the fourth embodiment.

This configuration will be briefly described as a third embodiment with reference to FIGS. 14 and 15.

That is, holding pieces 71 having long holes 71a which are elongated in the width direction are provided at proper points of two side edges 22a of a frame-like body 22. Further, engagement pins 72 (or roller shafts) are movably engaged into the long holes 71a. The pair of engagement pins 72 provided on the left and right sides are coupled to each other by a folding link member 73. Furthermore, a guide roller 75 (a cam follower) is provided in the center portion of the folding link member 73. The guide roller is guided in contact with a cam face 74a of a cam plate 74 (an example of a guide body) similarly to the above description. As a matter of course, a horizontal support shaft 30 which supports a leg portion 26 of the frame-like body 22 is disposed below the cam face 74a of the cam plate.

In addition, similarly to the above-described embodiments, the cam face 74a of the cam plate 74 adjusts the degree of curve of a reflecting mirror 24 according to the tilting position of the reflecting mirror 24, so that the reflected light converges on a heat collecting pipe body 13.

Therefore, the curve of the reflecting mirror 24 reaches a maximum when the reflecting mirror 24 is positioned at the vertex of the parabola, that is, the sun, the reflecting mirror 24, and the heat collecting pipe body 13 are linearly aligned with each other, in other words, the solar light is incident at a right angle to the reflecting mirror 24. Accordingly, for example, when the sun moves from the position to the west and the reflecting mirror 24 at the vertex of the parabola is tilted, the guide roller 75 of the folding link member 73 is pushed toward the reflecting mirror 24 to urge the reflecting mirror 24 toward two outer sides thereof, so that the degree of curve of the reflecting mirror 24 is reduced. That is, similarly to the above-described embodiments, the reflecting mirror 24 is tilted according to the altitude of the sun, so that the solar light is reflected to the heat collecting pipe body 13 and the degree of curve of the reflecting surface of the reflecting mirror is adjusted to improve light collection efficiency. Hence, the reflected solar light can be efficiently guided to the heat collecting pipe body 13.

Fourth Embodiment

In the first to third embodiments, the two side edges of the reflecting mirror are supported by the frame-like body. However, the curvature of the reflecting mirror may be adjusted, for example, by moving the two side edges up or down while the center portion of the reflecting mirror (a portion along the center line) is supported.

This configuration will be briefly described as a fourth embodiment with reference to FIGS. 16 to 22.

Specifically, as shown in FIGS. 17 to 22, a solar light collecting device 102 of a solar heat collecting facility 101 according to the fourth embodiment includes: support beams 111; strut bodies 112 which stand on the support beams 111 in the front, back, and intermediate positions; rotation support shafts 114 which are disposed on the front and back strut bodies 112 via bearings 113 so as to be rotatable about a horizontal axis; a bar-like body 115 as a tilting body which is jointed with the rotation support shafts 114 so as to be tiltable in a vertical plane along the left-right direction; a flexible reflecting mirror 116 which is supported by the bar-like body 115 and is rectangular-shaped in plan view; an electric motor with speed reducer 117 (an example of a tilting device, alternatively referred to as tilting equipment) which is jointed with the rotation support shaft 114 to tilt the bar-like body 115, that is, the reflecting mirror 116 in the vertical plane by the rotation of the rotation support shaft 114; a controller 118 which controls the electric motor 117; and a curve adjusting device 119 (also referred to as curve adjusting equipment) which moves two side edges of the reflecting mirror 116 up or down according to the tilting position of the reflecting mirror 116 to adjust the curvature of the cross-section (a vertical plane parallel to the short side of the reflecting mirror). The electric motor 117 is supported by, for example, the strut body 112. Further, depressions 116a for bolt fixation are formed in the reflecting mirror 116 at predetermined intervals. Furthermore, the depressions 116a are used not only for bolt fixation but also for stiffness adjustment. In other words, since the degree of curve of the reflecting mirror 116 is varied according to the altitude of the sun, the depressions 116a change the stiffness of the reflecting mirror 116 in the cross-sectional direction. Known driving sources such as an oil hydraulic cylinder may be used instead of the electric motor 117. In addition, the support beams 111 and the strut bodies 112 may be collectively referred to as support frames.

The bar-like body 115 includes: a main support member 122 which is fixed to the rotation support shafts 114 in the front-back direction via mounting brackets 121 provided on the front and back ends of the main support member 122; and auxiliary support members 123 which are disposed so as to project obliquely upward at a total of six points. Three of the auxiliary support members 123 are located on the right of the main support member 122 and the other three on the left side thereof, in the front, back, and intermediate positions of the main support member 122.

Further, the curve adjusting device 119 includes: bar-like moving bodies 126 which are movably held by mounting plates 124 provided on the auxiliary support members 123 of the bar-like body 115 in the projecting directions of the auxiliary support members 123 via pairs of retention brackets 125; pairs of left and right bar-like supporters 127 (pipes or the like are used) which are joined with the leading ends of the three bar-like moving bodies 126 on the left side and the leading ends, of the three bar-like moving bodies 126 on the right side to support the left and right side edges of the reflecting mirror 116 from therebelow; coil springs 128 (an example of an urging member) which are fitted between the retention brackets 125 on the other end sides of the bar-like supporters 127 and closer to the center and boss sections 126a on the other end sides to urge the bar-like moving bodies 126 toward the center side; cam plates 130 (an example of a guide body) which are disposed on the strut bodies 112 in contact with guide rollers 129 (cam followers, an example of a contact member) provided on the other ends (inner ends, that is, the center side of the reflecting mirror) of the bar-like moving bodies 126, and are capable of moving the bar-like moving bodies 126 in the axial direction against the urging force of the coil springs 128 to move the bar-like supporters 127 up or down. Deflection preventing plates 131 are fixed to the undersurfaces of the left and right bar-like supporters 127 to prevent deflection thereof.

In the drawings of the fourth embodiment, similarly to the second embodiment, the reflecting mirror 116 is divided into two pieces in the front-back direction, and the fourth embodiment is described with a focus on one of the two pieces of the reflecting mirror 116. As a matter of course, the reflecting mirror 116 may be a single sheet without being divided into two pieces.

Also in this configuration, the electric motor 117 is controlled by the controller 118 to tilt the bar-like body 115, that is, the reflecting mirror 116 according to the movement of the sun.

Further, according to the tilting position of the reflecting mirror 116, the bar-like supporters 127 which support the two side edges of the reflecting mirror 116 from therebelow are obliquely moved by the cam plates 130, in other words, the bar-like supporters 127 are adjusted to be moved up or down. That is, the curvature of the reflecting mirror 116 is varied, so that the reflected solar light converges on a heat collecting pipe body 13.

As a matter of course, as in the above-described embodiments, a cam face 130a of the cam plate 130 adjusts the degree of curve of the reflecting mirror 116 according to the tilting position of the reflecting mirror 116, so that the reflected light converges on the heat collecting pipe body 13.

As a matter of course, since the solar light collecting devices 102 are provided in different positions, the cam faces 130a of the cam plates 130 are shaped such that solar light collection efficiency becomes optimum in the respective positions.

In the fourth embodiment, as in the above-described embodiments, the reflecting mirror 116 is tilted according to the altitude of the sun, so that the solar light is reflected to the heat collecting pipe body 13. Further, the degree of curve of the reflecting surface of the reflecting mirror 116 is adjusted such that solar light collection efficiency becomes optimum. Hence, the reflected solar light can be efficiently introduced to the heat collecting pipe body 13.

Fifth Embodiment

In the fourth embodiment, the center portion (a portion along the center line) of the reflecting mirror is supported, and the proper points of two side edges of the reflecting mirror are moved up or down by guide bodies such as cam plates. However, the curvature of the reflecting mirror may be adjusted by moving up or down the two side edges substantially across the entire length thereof.

This configuration will be briefly described as a fifth embodiment with reference to FIGS. 23 to 28.

Figure 23:
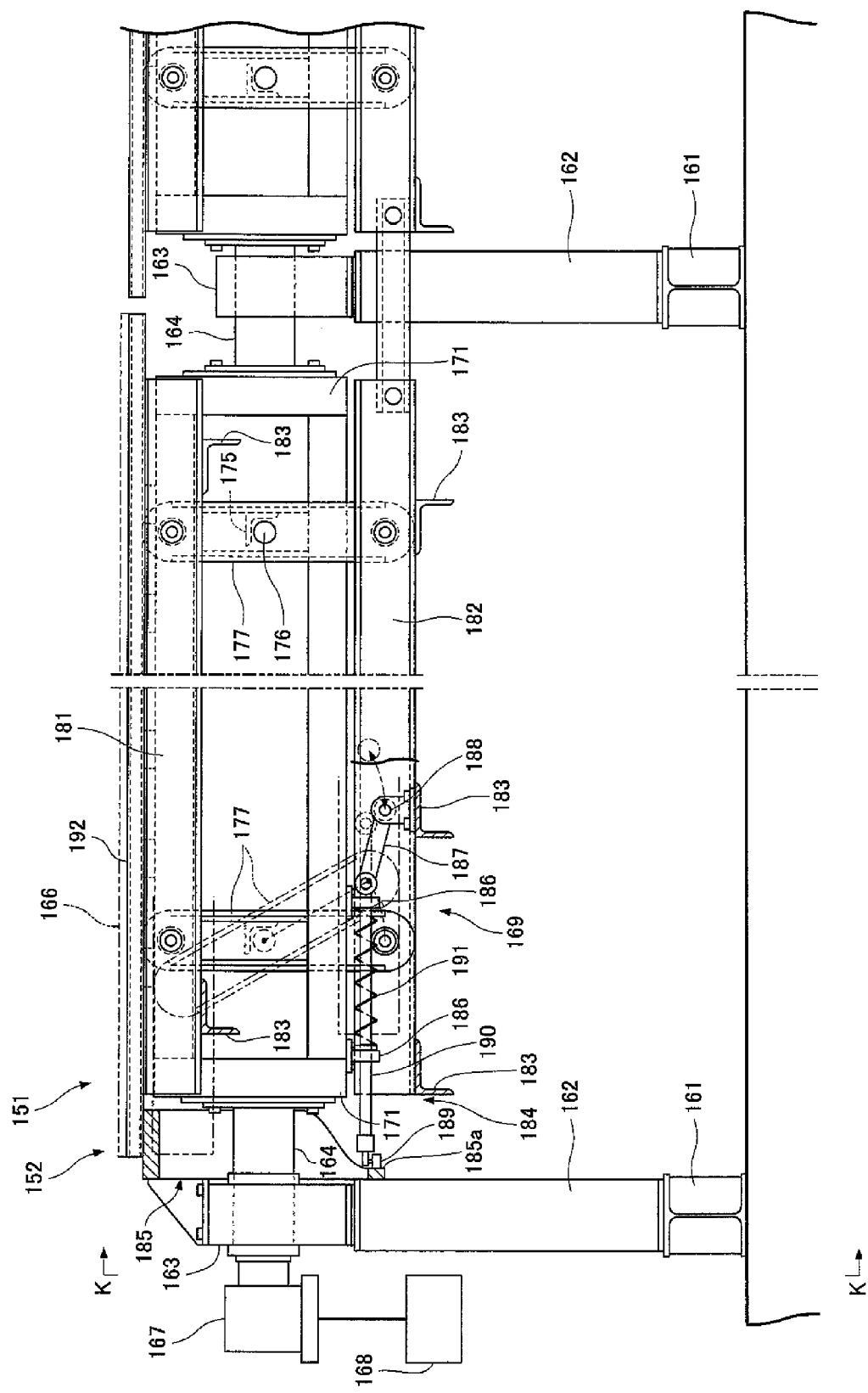
FIG. 23 is a partially cutaway side view of a solar light collecting device according to a fifth embodiment of the present invention.
Figure 24:
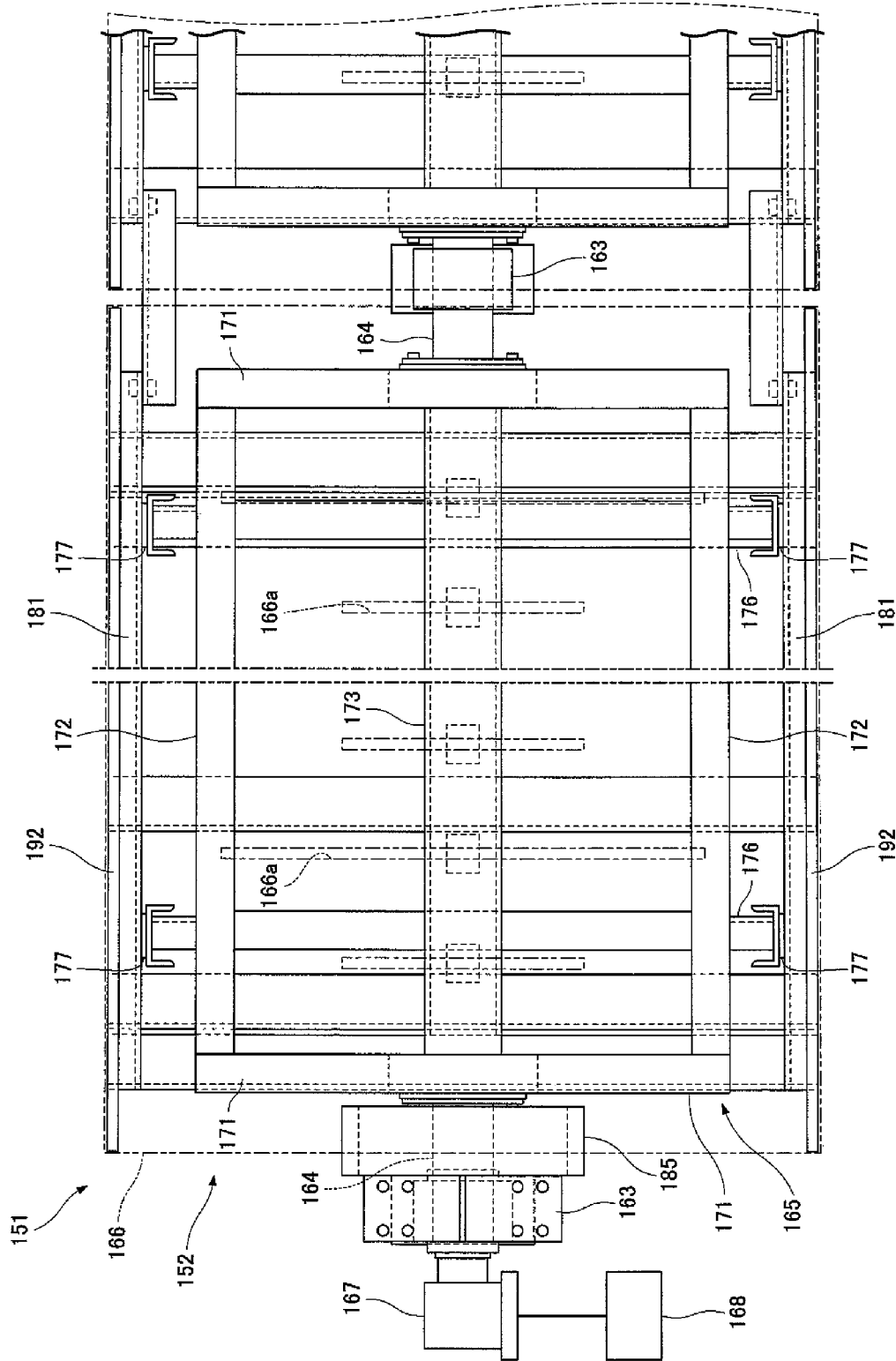
FIG. 24 is a partially omitted plan view of the solar light collecting device according to the fifth embodiment.

Specifically, as shown in FIGS. 23 to 25, a solar light collecting device 152 of a solar heat collecting facility 151 according to the fifth embodiment includes: support beams 161; strut bodies 162 which stand on the support beams 161 in the front and back positions; rotation support shafts 164 which are disposed on the front and back strut bodies 162 via bearings 163 so as to be rotatable about a horizontal axis; a frame-like body 165 as a tilting body which is jointed with the rotation support shafts 164 so as to be tiltable in a vertical plane along the left-right direction; a flexible reflecting mirror 166 which is supported by the frame-like body 165 and is rectangular-shaped in plan view; an electric motor with speed reducer 167 (an example of a tilting device, alternatively referred to as tilting equipment) which is jointed with the rotation support shaft 164 to tilt the frame-like body 165, that is, the reflecting mirror 166 in the vertical plane by the rotation of the rotation support shaft 164; a controller 168 which controls the electric motor 167; and a curve adjusting device 169 (also referred to as curve adjusting equipment) which moves two side edges of the reflecting mirror 166 up or down according to the tilting position of the reflecting mirror 166 to adjust the curvature of the cross-section (a vertical plane parallel to the short side of the reflecting mirror). The electric motor 167 is supported by, for example, the strut body 162. Further, depressions 166a for bolt fixation are formed in the reflecting mirror 166 at predetermined intervals. Furthermore, the depressions 166a are used not only for bolt fixation but also for stiffness adjustment. In other words, since the degree of curve of the reflecting mirror 166 is varied according to the altitude of the sun, the depressions 166a change the stiffness of the reflecting mirror 166 in the cross-sectional direction. Known driving sources such as an oil hydraulic cylinder may be used instead of the electric motor 167. In addition, the support beams 161 and the strut bodies 162 may be collectively referred to as support frames.

The frame-like body 165 has an elongated box shape. Specifically, the frame-like body 165 includes: rectangular end framework members 171; four long coupling members 172 which couple the four corners of the end framework members 171 together; and a support beam 173 which is disposed at the center of the top surface in the front-back direction to support the reflecting mirror 166.

The curve adjusting device 169 includes: swing levers 177 (an example of a swing member) which are swingably provided on support members 175 via a horizontal shaft member 176 in a vertical plane, the support members 175 being provided on the two sides of the frame-like body 165; upper coupling members 181 (also referred to as upper chord members) which connect the upper ends of the left and right swing levers 177 to each other and lower coupling members 182 (also referred to as lower chord members) which connect the lower ends of the left and right swing levers 177 to each other; upper and lower horizontal coupling members 183 which connect the left and right upper coupling members 181 to each other and the left and right lower coupling members 182 to each other; and a swing drive device (swing drive equipment) 184 which is disposed on either of the front and back ends of the frame-like body 165 and swings the swing levers 177 according to the tilting of the frame-like body 165.

Further, the swing drive device 184 includes: a ring-shaped cam plate 185 formed in an annular shape in front view which is provided on the side of the strut body 162 in a vertical plane in the left-right direction; a bar-like moving body 190 which has an intermediate portion movably held by the frame-like body 165 via retention brackets 186 in the front-back direction, one end connected to the horizontal coupling member 183 by a connecting member 187 and a coupling pin 188, and the other end provided with a guide roller 189 (an example of a contact member, that is, a cam follower) in contact with a cam face 185a of the above-mentioned cam plate 185; a coil spring (urging member) 191 which is provided on the circumference of the bar-like moving body 190 to urge the bar-like moving body 190 toward the cam plate 185 and press the guide roller 189 against the cam face 185a. The cam face 185a is tilted in the front-back direction. Thus, the bar-like moving body 190 moves in the front-back direction. In addition, linear supporters 192 are provided on the top surfaces of the left and right upper coupling members 181 to directly support the reflecting mirror 166. A supporting and connecting member is composed of the upper coupling members 181 and the linear supporters 192, but, for example, the reflecting mirror 166 can be supported only by the upper coupling members 181.

In the above-described configuration, when the frame-like body 165 is tilted by the electric motor 167 according to the position of the sun, the bar-like moving body 190 moves in the front-back direction following the cam face 185a of the cam plate 185. When the bar-like moving body 190 moves in this way, all the swing levers 177 swing in synchronization via the horizontal coupling members 183. Therefore, the upper coupling members 181 move in the vertical direction to allow the two side edges of the reflecting mirror 166 to move up or down, so that the curvature of the reflecting surface of the reflecting mirror 166 is adjusted to an appropriate value.

As a matter of course, as in the above-described embodiments, the cam face 185a of the cam plate 185 adjusts the degree of curve of the reflecting mirror 166 according to the tilting position of the reflecting mirror 166, so that the reflected light converges on a heat collecting pipe body 13.

As a matter of course, since the solar light collecting devices 152 are provided in different positions, the cam faces 185a of the cam plates 185 are shaped such that solar light collection efficiency becomes optimum in the respective positions.

Figure 26:
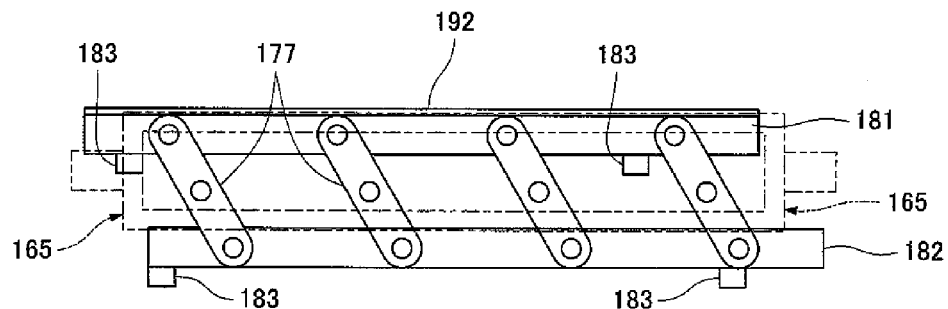
FIG. 26 is a principal side view illustrating a curving operation with a curve adjusting device of the solar light collecting device according to the fifth embodiment.
Figure 27:
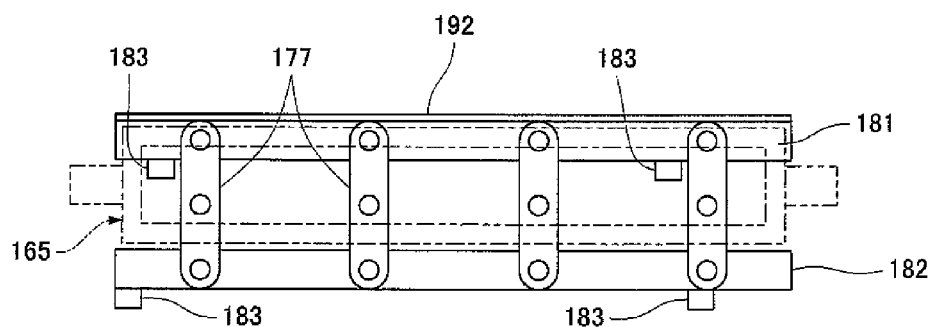
FIG. 27 is a principal side view illustrating the curving operation with the curve adjusting device of the solar light collecting device according to the fifth embodiment.
Figure 28:
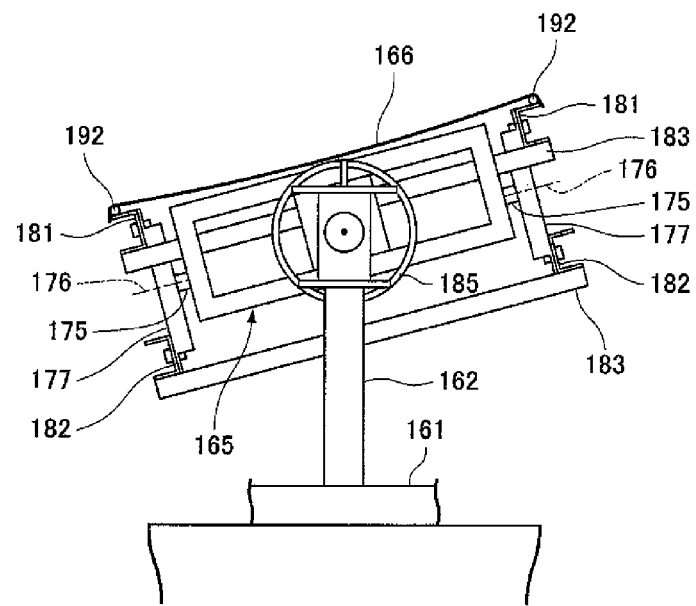
FIG. 28 is a principal end view illustrating the curving operation with the curve adjusting device of the solar light collecting device according to the fifth embodiment.

FIG. 26 illustrates that the swing levers 177 are tilted. In addition, FIGS. 27 and 28 illustrate that the frame-like body 165 is tilted and the swing levers 177 stand.

As a matter of course, the orientation of the reflecting mirror 166 can be caused to follow the movement of the sun by rotating the frame-like body 165 in the left-right direction with the electric motor 167.

In the drawings of the fifth embodiment, as in the second embodiment, the reflecting mirror 166 is divided into two pieces in the front-back direction, and the fifth embodiment is described with a focus on one of the two pieces of the reflecting mirror 166. As a matter of course, the reflecting mirror 166 may be a single sheet without being divided into two pieces.

In the fifth embodiment, as in the above-described embodiments, the reflecting mirror 166 is tilted according to the altitude of the sun, so that the solar light is reflected to the heat collecting pipe body 13. Further, the degree of curve of the reflecting surface of the reflecting mirror 166 is adjusted such that solar light collection efficiency becomes optimum. Hence, the reflected solar light can be efficiently introduced to the heat collecting pipe body 13.

In the meantime, in the curve adjusting devices of the above-described embodiments, for example, gear mechanisms or link mechanisms may be used instead of the cam plates, that is, cam mechanism.

In addition, in the above-described embodiments, the degrees of curve of the reflecting surfaces of the reflecting mirrors are varied automatically, that is, concurrently when the reflecting mirrors are tilted according to the altitude of the sun. However, the reflecting mirrors may be independently driven. In this case, an electric cylinder, a motor, or the like is provided on each reflecting mirror.

In addition, in the fourth and fifth embodiments, the provision of the depressions changes the stiffness of the reflecting mirror. However, another method may be adopted in which rib plates in the left-right direction are fixed to the rear surface of the reflecting mirror at predetermined intervals along the front-back direction, and the heights of the rib plates are varied in the left-right direction. Rib plates 81 are indicated by the virtual lines of FIGS. 4, 11, and 14. Further, the thickness of the reflecting mirror may be varied in the left-right direction.

What is claimed is:

1. A solar light collecting device comprising:
a tilting body provided on a support frame so as to be tiltable in a vertical plane;
a reflecting mirror which is supported by the tilting body, has a reflecting surface with a parabolic or quasi-parabolic cross section, and is capable of reflecting solar light to a heat collecting device; and
a tilting device which tilts the tilting body according to an altitude of the sun to introduce the light reflected by the reflecting mirror to the heat collecting device disposed at a focal point of the reflecting surface,
wherein
the reflecting mirror is rectangular-shaped in plan view and is made of a flexible material,
the solar light collecting device further comprises a curve adjusting device which is disposed below the reflecting mirror and changes a degree of curve of the reflecting surface of the reflecting mirror according to a tilting position of the tilting body,
a frame-like body is provided as the tilting body to support the reflecting mirror, and
the curve adjusting device comprises:
a plurality of swing members which are swingably provided on two sides of the frame-like body in the vertical plane;
left and right support coupling members which couple upper ends of the swing members on the two sides to each other and are capable of supporting side edges of the reflecting mirror;
coupling members which couple the left and right swing members to each other;
bar-like moving bodies which are movably provided on the frame-like body and have one ends coupled to the coupling members;
contact members which are provided on other ends of the bar-like moving bodies;
urging members which are provided on the bar-like moving members to urge the bar-like moving bodies toward the contact members; and
a guide body which is capable of moving up or down the left and right support coupling members which couple the swing members to change the degree of curve of the reflecting surface of the reflecting mirror by contacting the contact members on the bar-like moving bodies to move the bar-like moving bodies to move up or down the left and right support coupling members.

* * * * *